(12) United States Patent
Tanaka et al.

(10) Patent No.: US 9,313,682 B2
(45) Date of Patent: Apr. 12, 2016

(54) TEST DEVICE AND TEST METHOD

(71) Applicant: ANRITSU CORPORATION, Kanagawa (JP)

(72) Inventors: Junya Tanaka, Kanagawa (JP); Yasuyuki Matsuyama, Kanagawa (JP); Takuma Goto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 157 days.

(21) Appl. No.: 14/100,448

(22) Filed: Dec. 9, 2013

(65) Prior Publication Data

US 2014/0204912 A1 Jul. 24, 2014

(30) Foreign Application Priority Data

Jan. 18, 2013 (JP) ................................ 2013-007931

(51) Int. Cl.
| | |
|---|---|
| H04B 7/216 | (2006.01) |
| H04L 12/26 | (2006.01) |
| H04W 4/00 | (2009.01) |
| H04W 24/10 | (2009.01) |
| H04L 5/00 | (2006.01) |
| H04B 17/23 | (2015.01) |
| H04B 17/382 | (2015.01) |
| H04W 24/06 | (2009.01) |

(52) U.S. Cl.
CPC .............. *H04W 24/10* (2013.01); *H04B 17/23* (2015.01); *H04B 17/382* (2015.01); *H04L 5/0053* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 2011/0141934 A1* | 6/2011 | Aoki | .............................. 370/252 |
| 2013/0201913 A1* | 8/2013 | Niemela | ....................... 370/328 |

FOREIGN PATENT DOCUMENTS

JP 2008-252630 A 10/2008

* cited by examiner

*Primary Examiner* — Kiet Tang
(74) *Attorney, Agent, or Firm* — Pearne & Gordon LLP

(57) ABSTRACT

To provide a test device and a test method which enable a tester to easily check the allocation of physical channels when testing a mobile communication terminal which performs communication using a time division duplex system and a code division multiple access system.

An allocation status display control unit of a test device generates an allocation status display screen 46 indicating the correspondence of the physical channels to a time slot and a channelization code for each connection status on the basis of allocation setting information which is acquired and specified by a setting information acquisition unit. Therefore, the operator can easily check an allocation status for each connection status.

20 Claims, 19 Drawing Sheets

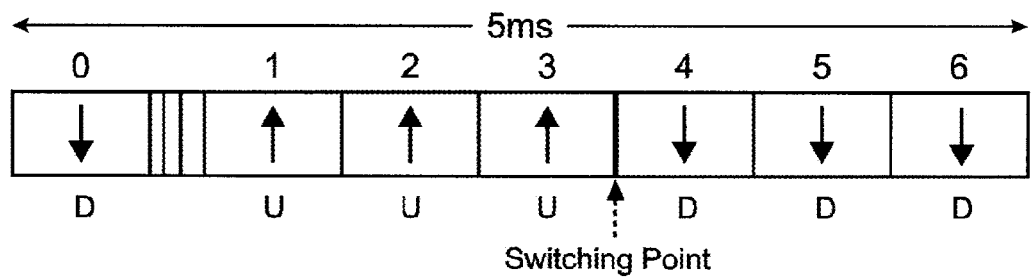
Downlink/uplink symmetric allocation
A
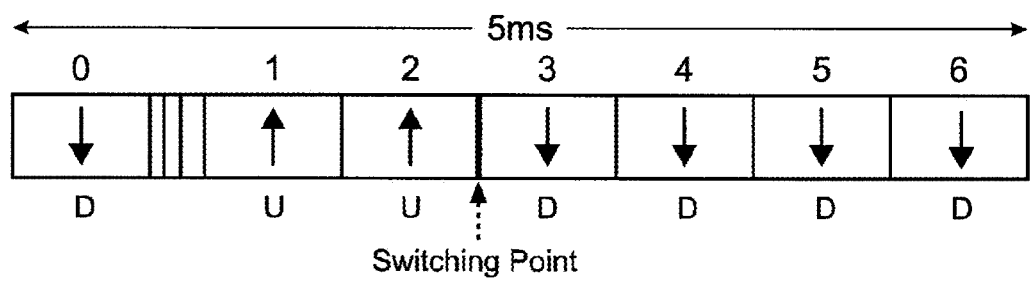
Downlink/uplink asymmetric allocation
B
FIG. 4

FIG. 5

| Status | Idle | | | | | | | |
|---|---|---|---|---|---|---|---|---|
| DL/UL | D | U | U | U | U | D | D | D |
| Slot No. | 0 | 1 | 2 | 3 | 4 | 5 | 6 | |
| ChCode 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |

```
INT InitParam_PhyRlSetup_P_CCPCH_BTS1()
{
    CPHY_RL_SETUP_TDS_PAR *CphyRlSetupPar;

CphyRlSetupPar = &CphyRlSetup_P_CCPCH_BTS1;
    memset( CphyRlSetupPar, 0, sizeof(CPHY_RL_SETUP_TDS_PAR) );

CphyRlSetupPar->ScrCode           = 127;
    CphyRlSetupPar->MidAllocMode      = DEFAULT_MIDAMBLE;
    CphyRlSetupPar->MidambleShift     = 0;
    CphyRlSetupPar->MidConfiguration  = 4;    // K8
    CphyRlSetupPar->Power             = -90;   /* Power = -9.0dB */
    CphyRlSetupPar->PhyCHCode         = 1;
    CphyRlSetupPar->NumOfCHCodes      = 2;
    CphyRlSetupPar->StartSlot         = 0;
    CphyRlSetupPar->NumOfSlots        = 1;
    CphyRlSetupPar->SlotFormatFirstCH = SLOT_FORMAT_0;

return 0;
};
```

TEST DEVICE AND TEST METHOD

TECHNICAL FIELD

The present invention relates to a test device and a test method which test mobile communication terminals such as mobile phones.

BACKGROUND ART

In the development of mobile communication terminals, such as mobile phones or mobile devices, a test device has been used which tests whether the mobile communication terminal can normally communicate according to a communication standard. A test scenario in which the operation sequence or communication sequence of the test device is described is created and stored in the test device in advance. The test device operates as a pseudo-base station, communicates with the mobile communication terminal to be tested, and checks whether communication can be normally performed, according to the test scenario.

In a mobile communication standard, in general, plural types of channels are defined on the basis of the purpose or characteristics of communication data and the channels are multiplexed for communication. For example, a pseudo-base station apparatus has been proposed which displays the allocation status of various channels so as to be associated with the structure of layers so that the user recognizes whether the channels are correctly set to each of the physical, transport, and logical layers (for example, see Patent Document 1).

However, in mobile communication, duplex communication systems include a frequency division duplex (FDD) and a time division duplex (TDD) system. In the FDD system, different frequency bands are used for an uplink and a downlink. In the TDD system, the same frequency band is divided into time slots and a downlink and an uplink are allocated to the divided time slots. In some of the TDD systems (for example, time division-synchronous code division multiple access (TD-SCDMA)), the allocation of the downlink and the uplink to the time slots can be dynamically changed.

PRIOR ART DOCUMENT

Patent Document

[Patent Document 1] Japanese Unexamined Patent Application Publication No. 2008-252630

DISCLOSURE OF THE INVENTION

Problem that the Invention is to Solve

In the TDD system, particularly, the allocation of a physical channel to the time slot varies depending on the connection status between the base station and the mobile communication terminal. In a test for the mobile communication terminal corresponding to the TDD system, for example, when a communication error occurs, checking the allocation of the physical channel helps the tester to specify the cause of the error. However, when the tester checks the allocation status of the physical channel, it is necessary to check the allocation of each physical channel from a large number of communication logs after the test in the test device according to the related art. Therefore, it takes a lot of effort and time to check the allocation.

Accordingly, an object of the invention is to provide a test device and a test method which enable the tester to easily check the allocation of a physical channel and can reduce the effort and time of the test, particularly, when a CDMA system is used among TDD communication systems.

Means for Solving the Problem

In order to achieve the object, there is provided a test device 50 or 150 for testing a mobile communication terminal (10) that can perform communication using a code division multiple access system and a time division duplex system in which a communication frame is divided into a plurality of time slots. The test device includes a communication unit (54) that sets various physical channels and communicates with the mobile communication terminal, a display unit (41), a display control unit (42) that generates a display screen related to the test and displays the display screen on the display unit, and a setting information acquisition unit (51) that acquires setting information related to allocation of the physical channels. The display control unit includes an allocation status display control unit (422) that generates an allocation status display screen indicating the correspondence of the physical channels to the time slot and a channelization code on the basis of the acquired setting information.

Since the allocation status display control unit generates the allocation status display screen indicating the correspondence of the physical channels to the time slot and the channelization code on the basis of the setting information about the allocation of the physical channels and displays the allocation status display screen on the display unit, the operator can easily check the allocation status of the physical channels. Therefore, it is possible to reduce the effort and time required for the operator to check the allocation status.

The allocation status display control unit may generate the allocation status display screen in a table form in which a horizontal axis is a region indicating the time slot and a vertical axis is a region indicating the channelization code. Since the allocation status display screen has a table form, it is possible to improve the operator's intuitiveness in the recognition of the allocation status.

The test device according to the invention may further include a scenario processing unit 52 that directs the communication unit to perform communication according to a test scenario in which a communication sequence with the mobile communication terminal is described. The setting information acquisition unit may acquire setting information related to the allocation of the physical channels which is included in data of the test scenario. Since the setting information related to the allocation of the physical channels is acquired from data of the test scenario, the allocation status display control unit can generate a physical channel allocation status display screen in real time during a test.

The setting information acquisition unit may acquire setting information related to a communication direction for each time slot which is included in the test scenario. In addition, the allocation status display control unit may further generate information indicating the communication direction for each time slot in the allocation status display screen on the basis of the acquired setting information. According to this structure, since information about the communication direction can be displayed on the allocation status display screen, the operator can intuitively check the correspondence between the allocation status of the physical channels and the communication direction of the time slot.

The setting information acquisition unit may include a connection status determining unit (511) that determines a connection status between the mobile communication terminal and the communication unit on the basis of the test scenario. The allocation status display control unit may further generate information indicating the determined connection status in the allocation status display screen. According to this structure, since information about the connection status can be displayed on the allocation status display screen, the operator can check the current connection status in real time. In addition, the operator can check the correspondence between the connection status and the allocation status of the current physical channels or the communication direction in real time.

The test device may further include a log data generation unit 56 that generates log data of a communication sequence of the communication unit. The display control unit may further include a log display control unit (421) that displays a list of the log data on the display unit. The setting information acquisition unit may acquire setting information related to the allocation of the physical channels which is included in log data designated by an operator or log data related to the designated log data in the list of the log data. Since the setting information related to the allocation of the physical channels is acquired from the designated log data or the log data related to the designated log data, the allocation status display control unit can generate a physical channel allocation status display screen on the basis of the log data which is designated by the operator after a test.

The setting information acquisition unit may acquire setting information related to the communication direction for each time slot which is included in the designated log data or the log data related to the designated log data. The allocation status display control unit may further generate information indicating the communication direction for each time slot in the allocation status display screen on the basis of the acquired setting information. According to this structure, since the allocation of the communication direction can be displayed on the allocation status display screen, the operator can intuitively check the correspondence between the allocation status of the physical channels and the communication direction of the time slot.

The setting information acquisition unit may include a connection status determining unit (511) that determines a connection status between the mobile communication terminal and the communication unit on the basis of the designated log data or the log data related to the designated log data. The allocation status display control unit may further generate information indicating the determined connection status in the allocation status display screen. According to this structure, since the information about the connection status can be displayed on the allocation status display screen, the operator can check the connection status after a test. In addition, the operator can easily check the correspondence between the connection status and the allocation status of the physical channels or the communication direction.

The allocation status display control unit may generate an allocation status display screen indicating the correspondence of the physical channels to the time slot that is before or after the time of the connection status in the allocation status display screen generated by the display control unit, in response to an operation of the operator. Since the allocation status display screen in the past or future connection status is generated on the basis of the setting information of the log before or after the connection status of the allocation status display screen which is currently being displayed, the operator can easily check the allocation status display screen near the time of the connection status of the allocation status display screen which is currently being displayed.

The test device may further include a thinning-out unit 65 that thins out the amount of data of the allocation status display screen to be generated by the allocation status display control unit. According to this structure, it is possible to reduce the load of the allocation status display screen generation process of the display control unit and the screen monitoring load of the operator.

According to the invention, there is provided a test method for testing a mobile communication terminal (10) that can communicate using a code division multiple access system and a time division duplex system in which a communication frame is divided into a plurality of time slots. The test method includes: a step of acquiring setting information related to allocation of physical channels which are set for communication with the mobile communication terminal; a step of generating an allocation status display screen indicating the correspondence of the physical channels to the time slot and a channelization code on the basis of the acquired setting information; and a step of displaying the allocation status display screen.

Advantage of the Invention

According to the invention, the tester can easily check the allocation of physical channels to at least a time slot. Therefore, it is possible to reduce the effort and time of the tester.

BRIEF DESCRIPTION OF THE DRAWINGS

FIG. 4 is a diagram illustrating a change in communication direction with the movement of a switching point.

FIG. 5 shows the display format of an image indicating an allocation status generated by an allocation status display control unit.

FIG. 7 shows an example of the description of items related to, for example, a primary common control physical channel (P-CCPCH) in a test scenario.

FIG. 8 shows an example of an allocation status display screen in a predetermined connection status (a state in which a position is registered) which is displayed in the display format shown in FIG. 5.

FIG. 9 shows an example of the allocation status display screen in a predetermined connection status (a state in which an RRC path is connected) which is displayed in the display format shown in FIG. 5.

FIGS. 19A and 19B show examples of an allocation status display screen which is generated by the settings of a thinning-out process designated by the operator among plural types of settings of the thinning-out process.

BEST MODE FOR CARRYING OUT THE INVENTION

Hereinafter, embodiments of the invention will be described with reference to the drawings.

First Embodiment (Structure of Test Device)

Figure 1:
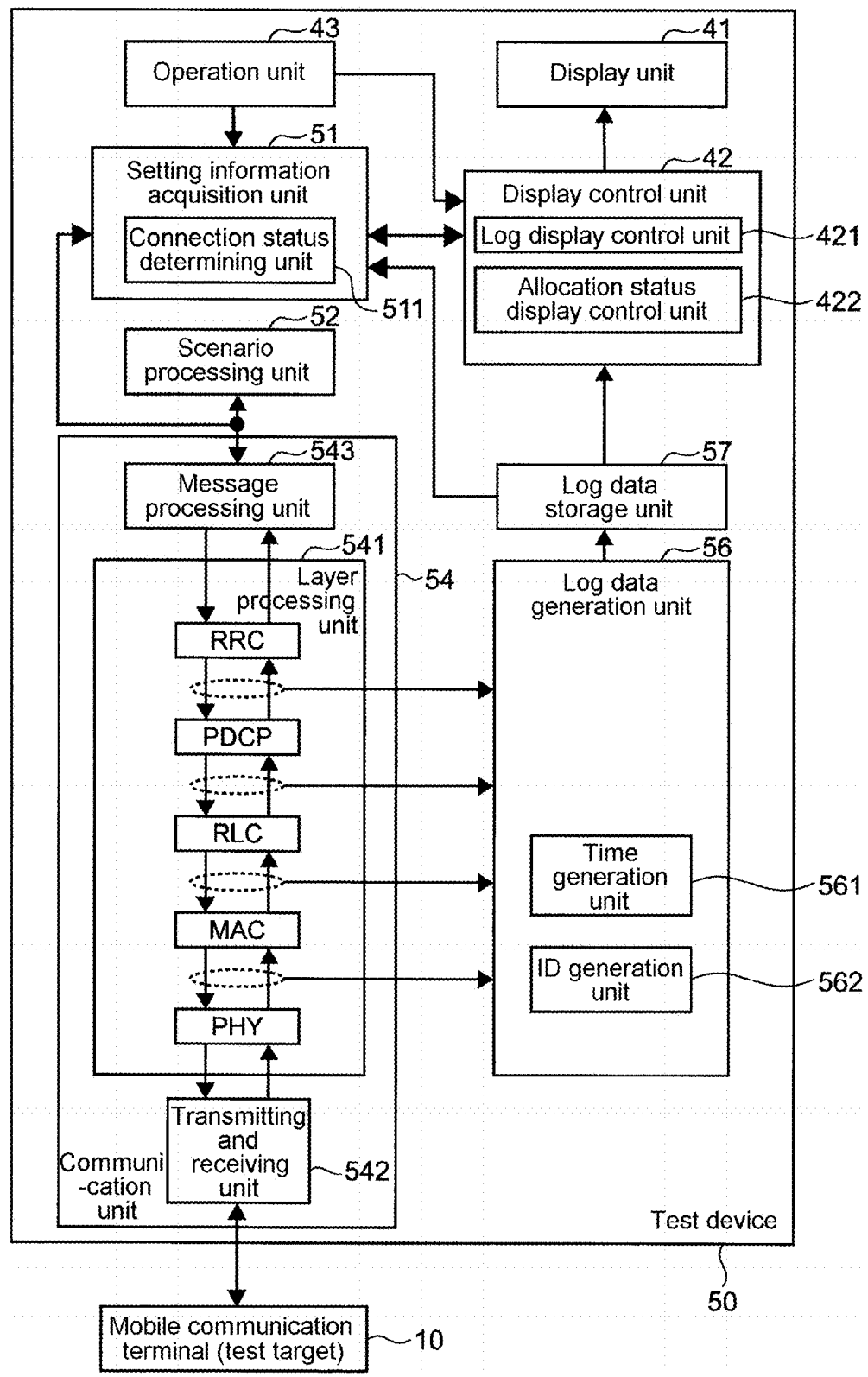
FIG. 1 is a block diagram illustrating the structure of a system including a test device according to a first embodiment of the invention.

FIG. 1 is a block diagram illustrating the structure of a system including a test device 50 according to a first embodiment of the invention. The system includes a mobile communication terminal 10 and the test device 50. In this embodiment, a case will be described in which a time division-synchronous code division multiple access (TD-SCDMA) system is used as a communication system between the mobile communication terminal 10 and the test device 50.

The mobile communication terminal 10 is, for example, a mobile phone, a data communication terminal, or a semiconductor device for mobile communication used in the mobile phone or the data communication terminal and the communication function thereof is tested by the test device 50. The test device 50 functions as a pseudo-base station and tests the mobile communication terminal 10.

The test device 50 includes an operation unit 43, a display unit 41, and a display control unit 42.

The operation unit 43 receives an operation from an operator including a tester. The operation unit 43 is, for example, a keyboard, a mouse, or a touch panel.

The display unit 41 displays a display image generated by the display control unit 42. The display unit 41 is, for example, a liquid crystal device.

The display control unit 42 generates an image to be displayed by the display unit 41. In addition, the display control unit 42 receives operational information which is input by the operator through the operation unit 43 and performs a process based on the operational information. The display control unit 42 includes a log display control unit 421 and an allocation status display control unit 422, which will be described below.

The operation unit 43, the display unit 41, the display control unit 42 and a log data storage unit 57, which will be described below, may be provided in, for example, a device which is provided separately from the test device 50 and the separate device may be connected to the body of the test device 50. For example, a personal computer (PC) is typically used as the separate device.

The test device 50 includes a setting information acquisition unit 51, a scenario processing unit 52, a communication unit 54, a log data generation unit 56, and the log data storage unit 57.

The scenario processing unit 52 acquires a scenario file, which is data for a test scenario for testing communication with the mobile communication terminal 10, from an external device (not shown), controls each unit of the test device 50 according to an operation sequence or a communication sequence of the test device 50 described in the scenario file, instructs a message processing unit 543, which will be described below, to generate a transmission message, receives the processing result of a response message received from the message processing unit 543, and determines an operation on the basis of the processing result. The external device is, for example, a storage device (not shown) or the above-mentioned PC and stores the scenario file. The test device 50 operates as a pseudo-base station and communicates with the mobile communication terminal 10, according to the test scenario.

The communication unit 54 has a function of setting various channels, such as a logical channel, a transport channel, and a physical channel, and communicating with the mobile communication terminal 10. Specifically, the communication unit 54 includes a message processing unit 543, a layer processing unit 541, and a transmitting and receiving unit 542.

The message processing unit 543 generates a transmission message to be transmitted to the mobile communication terminal 10 in response to instructions from the scenario processing unit 52. In addition, the message processing unit 543 processes a response message which is received from the mobile communication terminal 10 through the transmitting and receiving unit 542 and the layer processing unit 541 and notifies the scenario processing unit 52 of the processing result.

The transmission message used in the test scenario includes a transmission message which is related to the control of the mobile communication terminal 10 and a transmission message which is not related to the control of the mobile communication terminal 10. Examples of the transmission message which is related to the control include transmission power control information and notification information. Examples of the transmission message which is not related to the control include various kinds of user data, such as moving image data, still image data, voice data, and data for the content of mail.

The layer processing unit 541 processes the transmission message and the response message for each layer. The layer processing unit 541 performs communication protocol processing corresponding to a predetermined communication standard (in this embodiment, TD-SCDMA) for the transmission message generated by the message processing unit 543 and outputs the transmission message subjected to the communication protocol processing to the transmitting and receiving unit 542. In addition, the layer processing unit 541 performs the communication protocol processing for the response message which is received through the transmitting and receiving unit 542 and outputs the response message subjected to the communication protocol processing to the message processing unit 543.

The layer processing unit 541 outputs the content of the communication to the log data generation unit 56 whenever processing is performed in each layer. The layers include a radio resource control (RRC) layer, a packet data control protocol (PDCP) layer, a radio link control (RLC) layer, a media access control (MAC) layer, and a physical (PHY) layer from the upper side.

Each layer performs its own process for communication data received from the upper layer and transmits the processed communication data to the lower layer in a downlink. Each layer performs its own processing for communication data which is received from the lower layer and transmits the processed communication data to the upper layer in an uplink.

The transmitting and receiving unit 542 performs, for example, D/A conversion, modulation, and frequency conversion for downlink data which is output from the layer processing unit 541 and transmits the processed data to the mobile communication terminal 10. In addition, the transmitting and receiving unit 542 performs, for example, frequency conversion, demodulation, and A/D conversion for uplink data which is transmitted from the mobile communication terminal 10 and inputs the processed data to the layer processing unit 541. The transmitting and receiving unit 542 includes an RF signal transceiver or a digital interface which transmits and receives baseband signals such as IQ data.

The log data generation unit 56 generates log data from the communication data which is output from each layer of the layer processing unit 541. Specifically, the log data generation unit 56 adds a log header to the communication data obtained from each layer to generate log data. The log data generation unit 56 includes a time generation unit 561 and an ID generation unit 562. The time generation unit 561 generates time information for registering a log generation time in the log header. The ID generation unit 562 generates an identifier for identifying each of the generated log records in the log header.

The log header includes, for example, a transmission source layer and a destination layer, in addition to the ID and the time. In addition, the log header includes, for example, channel information, a base transceiver station (BTS) number, a primitive name, and a communication data length, which will be described below.

The log data storage unit 57 stores the log data generated by the log data generation unit 56. The log data storage unit 57 is a high-capacity storage medium, such as a hard disk drive (HDD) or a flash memory. The log data storage unit 57 may be an external storage device which is provided separately from the test device 50.

The log display control unit 421 displays the log data stored in the log data storage unit 57 on the display unit 41 in a predetermined display format.

The setting information acquisition unit 51 includes a connection status determining unit 511. When the test device 50 is currently communicating with the mobile communication terminal 10, the connection status determining unit 511 determines the connection status (connection stage) between the test device 50 and the mobile communication terminal 10. In this case, the connection status determining unit 511 determines the current connection status in real time on the basis of a transmission message generation instruction transmitted from the scenario processing unit 52 to the message processing unit 543 or the processing result of the response message transmitted from the message processing unit 543 to the scenario processing unit 52.

In addition, when there is no communication between the test device 50 and the mobile communication terminal 10 (after communication ends), the connection status determining unit 511 can determine the connection status between the test device 50 and the mobile communication terminal 10 on the basis of the communication log data stored in the log data storage unit 57. In this case, as described below, the connection status determining unit 511 determines the past connection status during communication on the basis of the log data designated by the operator.

The setting information acquisition unit 51 acquires setting information related to the allocation of the physical channel from the transmission message generation instruction which is mainly transmitted from the scenario processing unit 52 to the message processing unit 543. In addition, the setting information acquisition unit 51 can acquire the setting information related to the allocation of the physical channel from the log data stored in the log data storage unit 57. In this way, the setting information acquisition unit 51 specifies the allocation of a channel. Specifically, the setting information is information indicating the setting of the allocation of the physical channel to a time slot of a frame and the allocation of the physical channel to a channelization code. In a CDMA-based communication system, the channelization code is used to perform a spectrum spreading process in the physical layer.

In addition, the setting information acquisition unit 51 acquires setting information related to the allocation of a downlink/uplink, that is, a communication direction to the time slot from the test scenario. The setting information is, for example, information about a switching point, which will be described below, and is described in the test scenario in advance. The setting information acquisition unit 51 can acquire setting information related to the allocation of the communication direction to the time slot from the log data stored in the log data storage unit 57. Therefore, the setting information acquisition unit 51 can specify the allocation of the communication direction to the time slot (communication direction allocation).

The allocation status display control unit 422 displays the allocation status of the physical channel on the display unit 41 in a predetermined display format (see FIG. 4), which will be described below, on the basis of the channel allocation information based on the setting information acquired by the setting information acquisition unit 51. The allocation status display control unit 422 displays information indicating the allocation status of the communication direction to the time slot which is based on the setting information acquired by the setting information acquisition unit 51 and the connection status determined by the connection status determining unit 511, in addition to the allocation of the channel, on the display unit 41 in the above-mentioned display format, together with the allocation of the physical channel.

Although not shown in the drawings, the test device 50 may include a plurality of communication units 54. One communication unit 54 simulates the operation of one base station. Therefore, when the test device 50 includes a plurality of communication units, one test device 50 can test, for example, the hand-over operation of the mobile communication terminal 10 switching the base station which is a communication destination. In this case, the test device 50 includes a coupler (not shown) which combines signals transmitted from each communication unit, outputs the combined signal to the mobile communication terminal 10, and distributes the signals received from the mobile communication terminal 10 to each communication unit.

The test device 50 mainly includes hardware components, such as a central processing unit (CPU), a random access memory (RAM), a read only memory (ROM) (not shown). The test device 50 may include a programmable logic device (PLD), such as a field programmable gate array (FPGA), in addition to or instead of the CPU. Alternatively, the test device 50 may include, for example, a digital signal processor (DSP) and an application specific integrated circuit (ASIC).

The structure of the test device 50 may be implemented by only hardware or both hardware and software. In the latter case, the functions of each functional block of the test device 50 shown in the drawings are implemented by the cooperation between hardware which is a processor, such as the CPU, and software which is stored in, for example, the ROM or another storage device.

(Frame Structure of TD-SCDMA)

Figure 2:
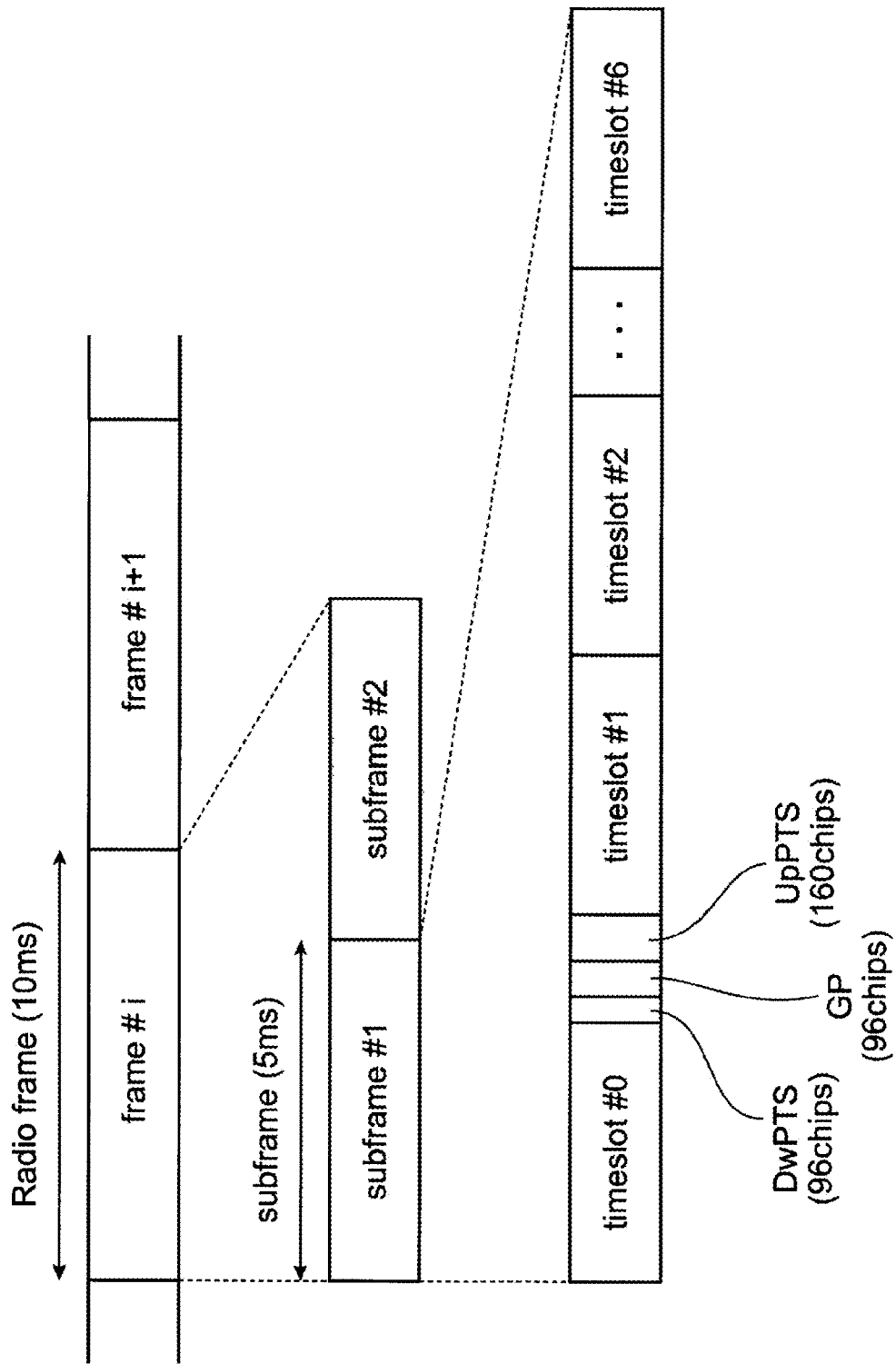
FIG. 2 shows the frame structure of TD-SCDMA.

FIG. 2 shows the frame structure of TD-SCDMA. A TD-SCDMA frame is a radio frame with a period of 10 ms. The radio frame includes two sub-frames.

Each sub-frame includes seven time slots from time slot #0 to time slot #6. A section DwPTS (Downlink Pilot Time Slot) including a signal for downlink synchronization, a no-signal section GP (Guard Period), and a section UpPTS (Uplink Pilot Time Slot) including a signal for uplink synchronization are provided between time slot #0 and time slot #1.

Figure 3:
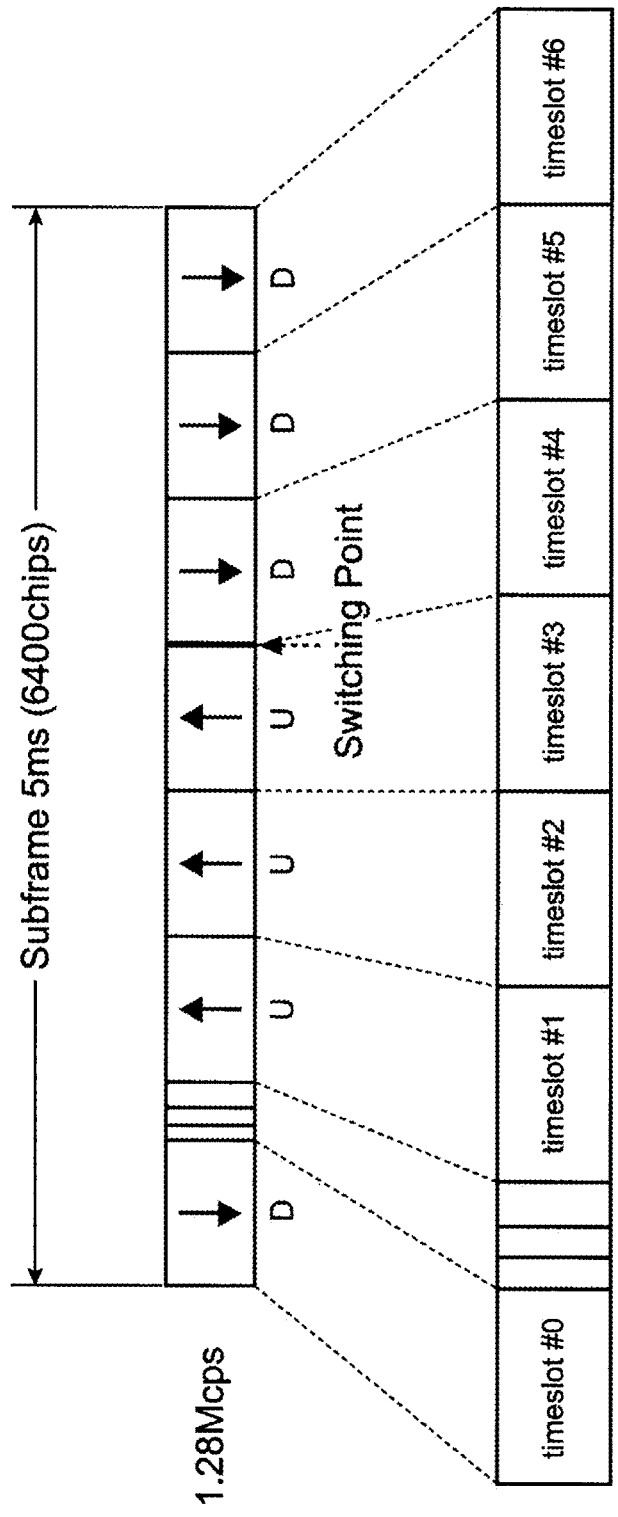
FIG. 3 shows an example of a downlink/uplink (communication direction) for each time slot.

FIG. 3 shows an example of the communication direction of each time slot. Time slot #0 is defined to be used for downlink communication from the base station, that is, the test device 50 to each mobile communication terminal 10 and time slot #1 is defined to be used for uplink communication. Time slot #2 to time slot #6 can be used in any direction. In some cases, time slot #6 can be defined to be used for downlink communication and time slot #1 to time slot #5 can be defined to be used in any direction, according to regulations.

The switching point determines the allocation of the uplink and the downlink to the time slot. Specifically, the switching point functions as a switching position from an uplink to a downlink. In the example shown in FIG. 3, the switching point is disposed between time slot #3 and time slot #4. An uplink is allocated to time slot #2 and time slot #3 and a downlink is allocated to time slot #4 to time slot #6.

In TD-SCDMA, the switching point is moved to change the allocation of the downlink/uplink. Specifically, the allocation can be dynamically changed depending on a communication state, for example, the congestion state of the network. In the example shown in FIG. 4A, the switching point is disposed between time slot #3 and time slot #4. In the example shown in FIG. 4B, the switching point is disposed between time slot #2 and time slot #3.

(Display Format of Allocation Status)

Figure 5:
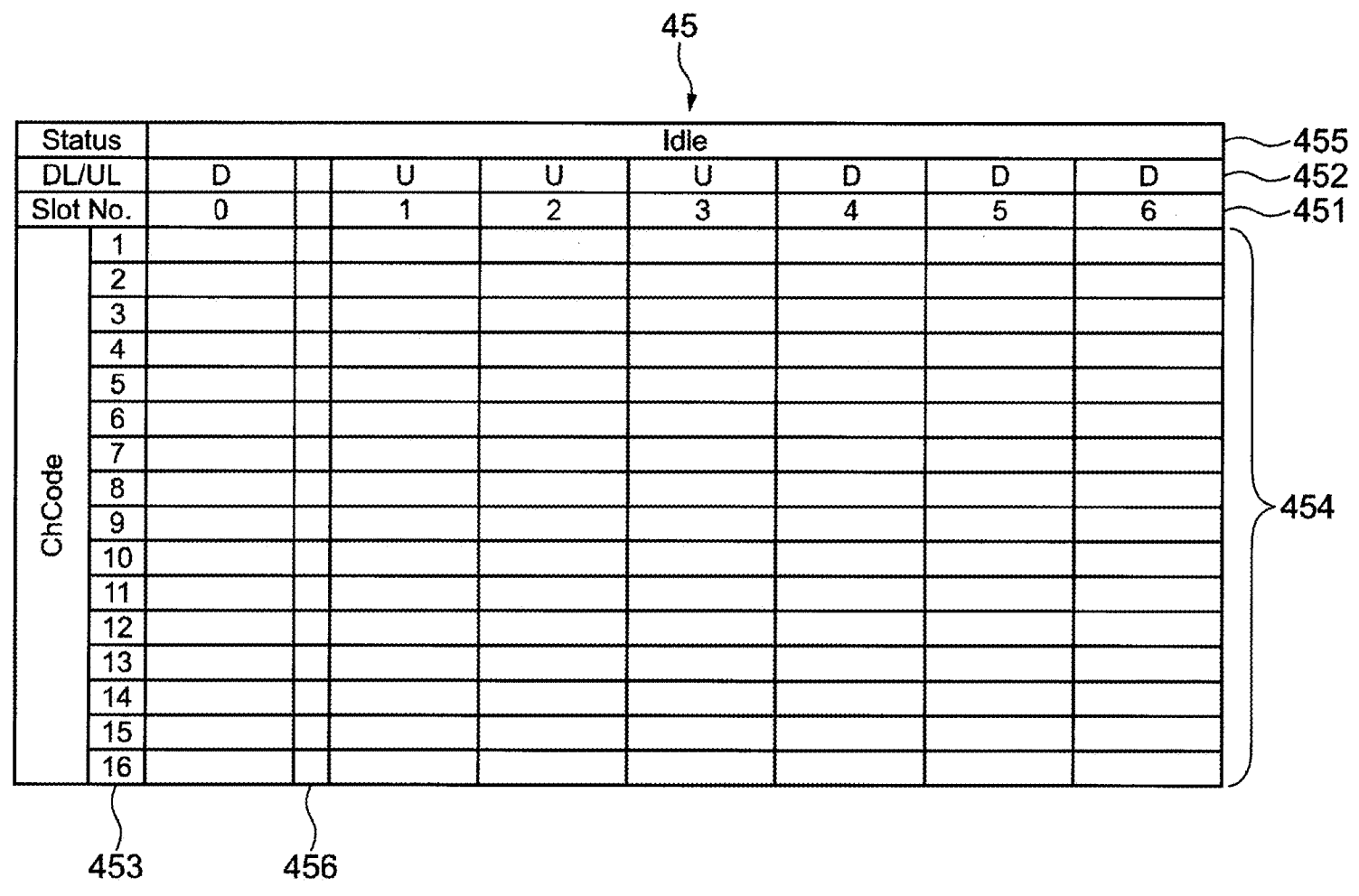

FIG. 5 shows the display format of an image indicating the allocation status generated by the allocation status display control unit 422. A display format 45 has a table form and includes a time slot number region 451 which is provided along the horizontal axis, a communication direction allocation region 452 which is provided along the time slot number region 451, a channelization code region 453 which is provided along the vertical axis, and a channel allocation region 454 with a matrix shape.

Identification numbers (Slot Nos.: 0 to 6) are arranged as information indicating fixed time slots in the time slot number region 451. Channelization code numbers (Ch code numbers: 1 to 16) are arranged as information indicating fixed channelization codes in the channelization code region 453. The downlink and the uplink which are allocated to each time slot, that is, information indicating the communication direction are represented by alphabets "U" and "D" in the communication direction allocation region 452. The information indicating the communication direction is variable in some time slots, as described above.

In the example shown in FIG. 5, for example, a region 455 indicating the connection status (Status) is provided at the top. As described above, the connection status is determined by the connection status determining unit 511 and is variable. The position of the region indicating the connection status is not limited to the top, but the region may be arranged at another position such as the bottom.

The display format includes a space region 456 which is provided between time slot #0 and time slot #1. The space region 456 corresponds to the slots DwPTS, GP, and UpPTS. The space region 456 may be removed from the display image.

(Display Process 1 of Allocation Status by Test Device)

Figure 6:
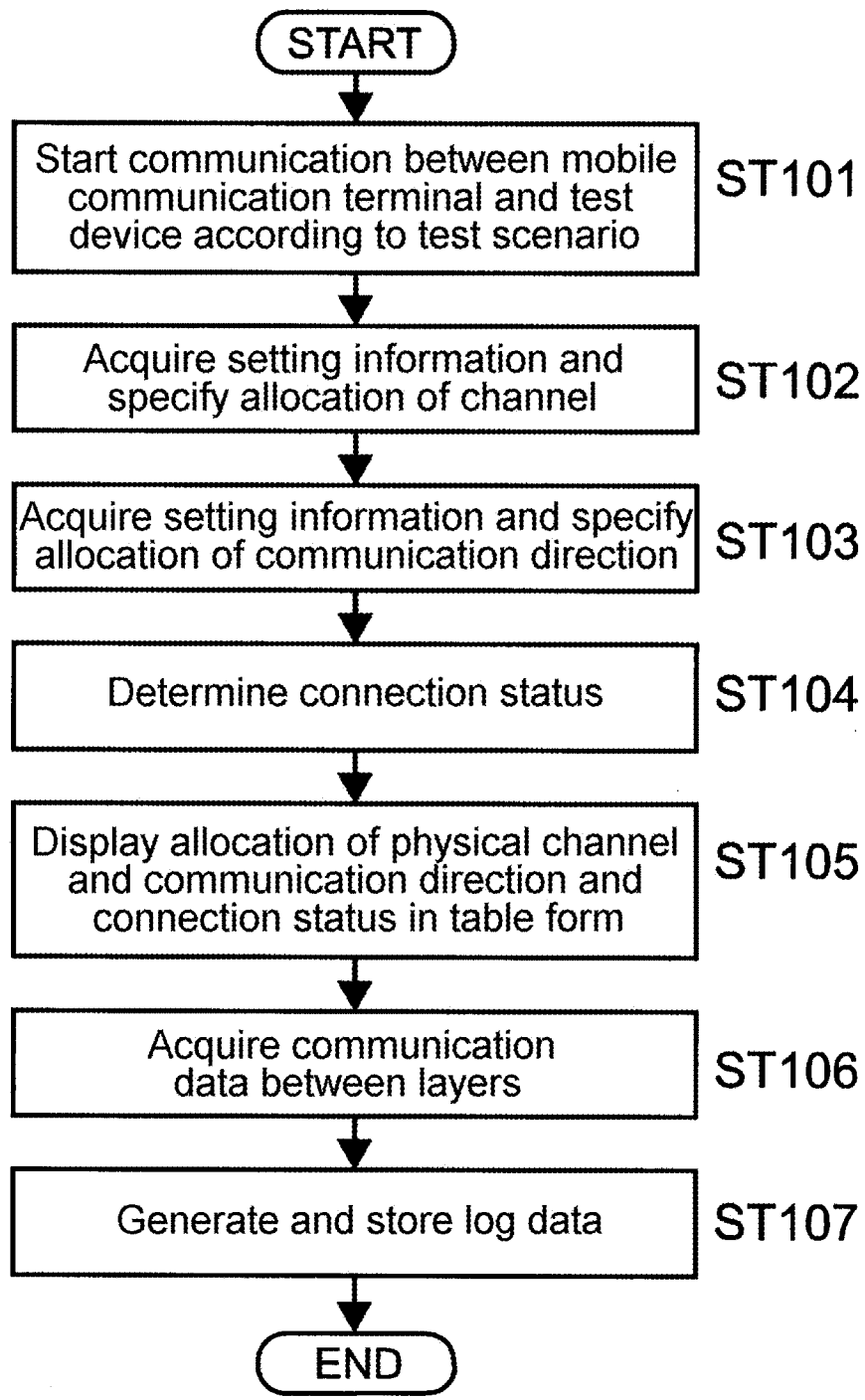
FIG. 6 is a flowchart illustrating an allocation status display process of the test device and shows an example in which the allocation status is displayed in real time during communication.

FIG. 6 is a flowchart illustrating the display process of the allocation status by the test device and shows an example of the real-time display of the allocation status during communication.

The scenario processing unit 52 reads the test scenario and starts the communication between the test device and the mobile communication terminal 10 according to the test scenario (Step 101).

The setting information acquisition unit 51 acquires the setting information related to channel allocation from data for the test scenario and specifies the allocation position of the physical channel (Step 102). Specifically, the allocation position of the physical channel is specified as follows.

FIG. 7 shows an example of the description of items related to a specific physical channel, for example, a primary common control physical channel (P-CCPCH) in the test scenario, as shown in a portion surrounded by a dashed line. The setting information acquisition unit 51 determines the allocation position of the physical channel with reference to the following items (1) to (4) (in FIG. 7, items surrounded by a one-dot chain line) among a plurality of parameters included in the description of the test scenario.

(1) PhyCHCode=1: which indicates that the head of the allocation position of the channelization code is 1 among channelization code numbers 1 to 16.

(2) NumOfCHCodes=2: which indicates that two channelization codes are allocated.

(3) StartSlot=0: which indicates that the head of the allocation position of the time slot is #0 among time slot #0 to time slot #6.

(4) NumOfSlots=1: which indicates that one time slot is allocated.

The items (1) and (2) show that P-CCPCH is allocated from channelization code number 1 to channelization code number 2. The items (3) and (4) show that P-CCPCH is allocated to time slot #0.

The setting information acquisition unit 51 specifies the allocation position of the downlink/uplink, that is, the communication direction to the time slot (Step 103). Although not shown in the drawings, the setting information acquisition unit 51 acquires a parameter indicating the position of the switching point as the setting information from data for the test scenario and specifies the parameter.

The connection status determining unit 511 determines the current connection status in real time on the basis of the data for the test scenario read by the scenario processing unit 52 or data for the transmission message and the response message exchanged with the message processing unit 543 (Step 104). For example, the connection status determining unit 511 determines the current connection status, a state in which the position of the mobile communication terminal 10 is registered, or a state in which a transmission path of control information is established, such as the connection of a signal radio bearer (SRB), which will be described below.

The determination of the connection status (Step 104) may be performed prior to Steps 102 and 103. In addition, the specification of the allocation of the communication direction (Step 103) may be performed prior to the specification of the allocation of the channel (Step 102).

The allocation status display control unit 422 displays the allocation of the physical channel and the allocation of the communication direction which are respectively specified in Steps 102 and 103 and the connection status which is specified in Step 104 in the display format 45 shown in FIG. 5 in a table form, which will be described in detail with reference to FIGS. 8 to 10 (Step 105).

Figure 8:
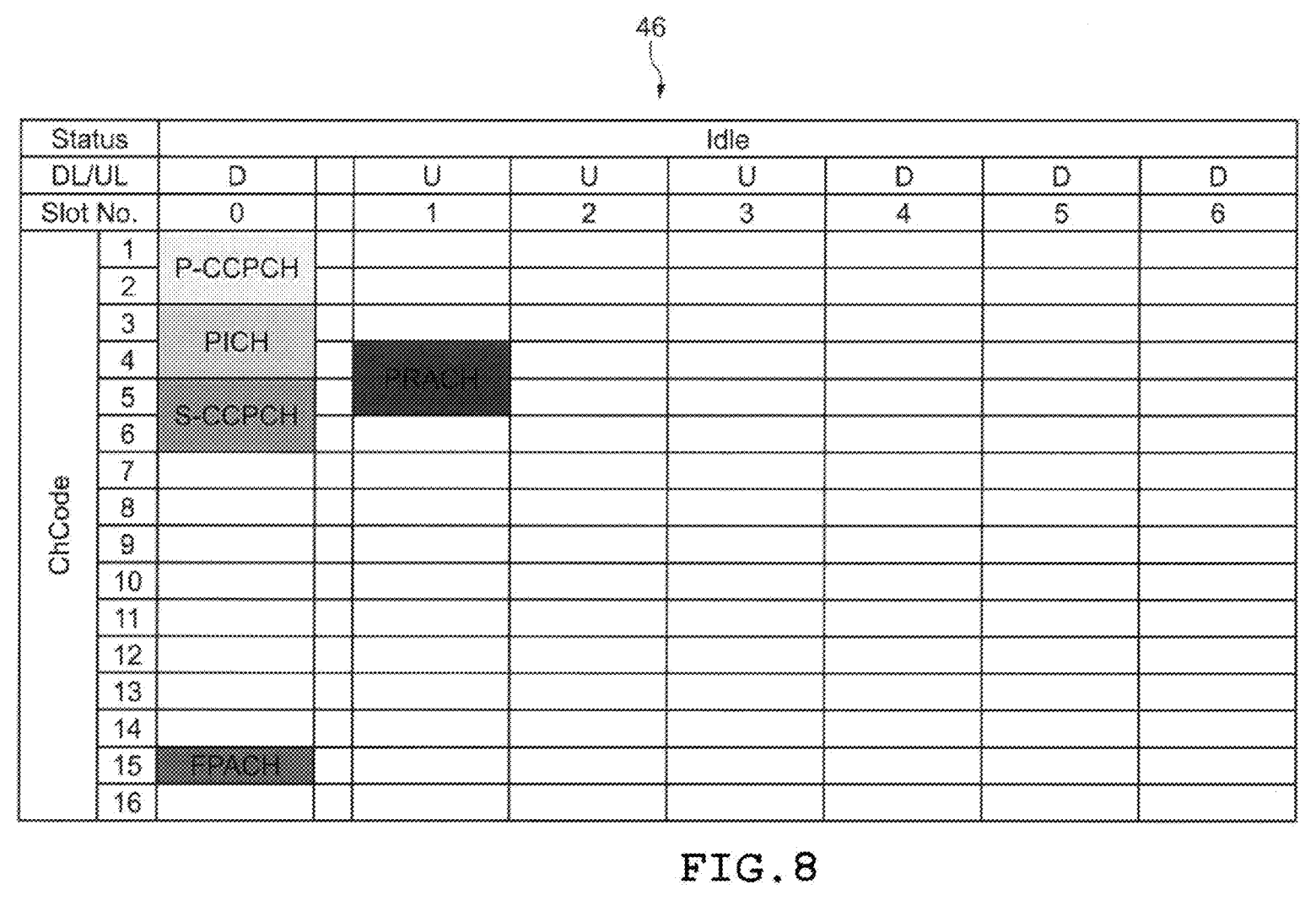
Figure 9:
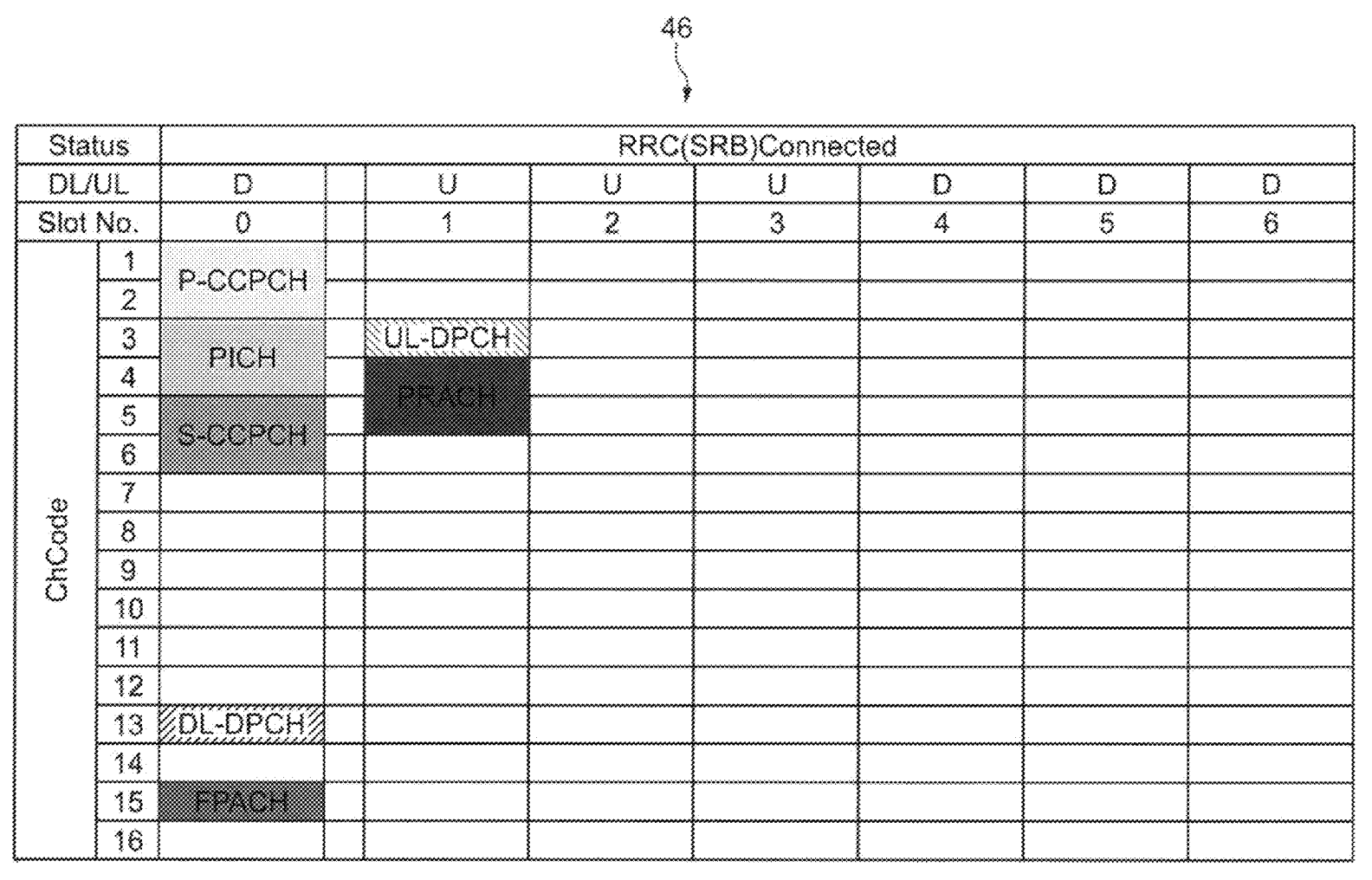
Figure 10:
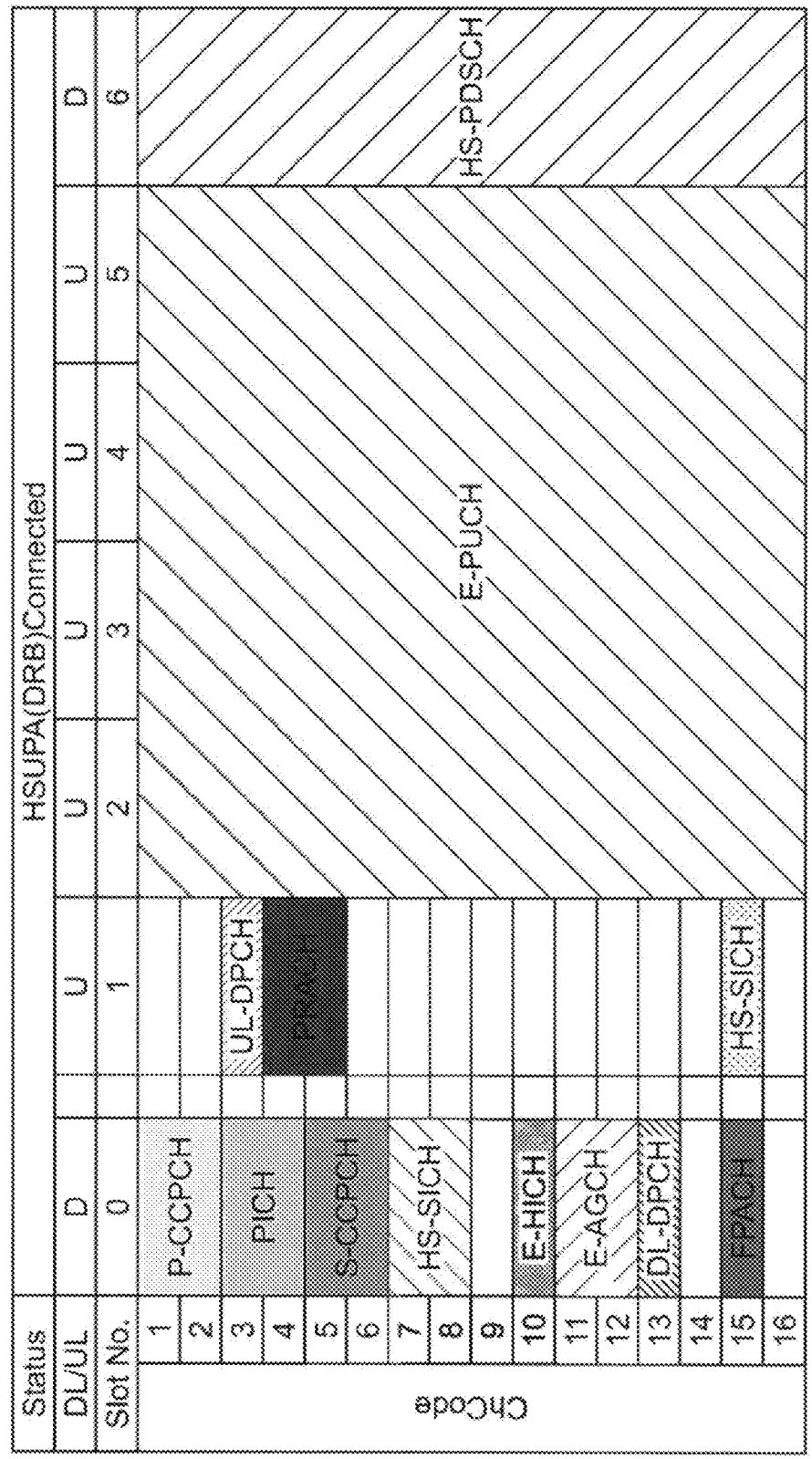
FIG. 10 shows an example of the allocation status display screen in a predetermined connection status (a state in which an HSUPA path is connected) which is displayed in the display format shown in FIG. 5.

FIGS. 8, 9, and 10 show examples of an allocation status display screen 46, which is displayed in the display format, in different connection statuses. FIGS. 8, 9, and 10 show only a fraction of the actual connection status.

In an "Idle" state shown in FIG. 8, the position of the mobile communication terminal 10 has been registered. In this connection status, as described in the above example, the channel P-CCPCH is allocated to time slot #0 and channelization code numbers 1 and 2. In this connection status, a paging indication channel (PICH) is allocated to channelization code numbers 3 and 4 in time slot #0, a secondary common control physical channel (S-CCPCH) is allocated to channelization code numbers 5 and 6 in time slot #0, and a fast physical access channel (FPACH) is allocated to channelization code number 15 in time slot #0 by the same process as described above in the setting information acquisition unit 51 and allocation status display control unit 422. In addition, a physical random access channel (PRACH) is allocated to channelization code numbers 4 and 5 in time slot #1. In addition, the switching point is set between time slot #3 and time slot #4.

Specifically, as shown in the drawings, as an image indicating the allocation of the physical channel, an image is displayed in which regions including letters indicating each physical channel are applied to regions that are arranged in a matrix along the horizontal axis and the vertical axis. In this embodiment, the regions indicating various physical channels have different colors. Therefore, the operator can recognize the physical channels with colors. As a result, it is possible to improve intuitiveness.

FIG. 9 shows a state in which a radio resource control (RRC) path is connected, that is, the SRB is established after the position is registered. Here, a downlink-dedicated physical channel (DL-DPCH) and an uplink-dedicated physical channel (UL-DPCH) are allocated. The position of the switching point is the same as that shown in FIG. 8.

FIG. 10 shows a state in which a high speed uplink packet access (HSUPA) path is connected in a high speed packet access system (HSPA) after the SRB is established. That is, this is a state in which a data radio bearer (DBR) is established and is mainly a state in which individual user data can communicate. Here, as the communication direction, the switching point is provided between time slot #5 and time slot #6, an uplink is allocated to time slot #2 to time slot #5, and a downlink is allocated to time slot #6. As the physical channels, a shared information channel for HS-DSCH (HS-SICH), an E (Enhanced)-DCH hybrid automatic repeat request (ARQ) indicator channel (E-HICH), an E-DCH absolute grant channel (E-AGCH), an E-DCH physical uplink channel (E-PUCH), and a high speed-physical downlink shared channel (HS-PDSCH) are allocated.

A series of processes of Steps 101 to 105 is repeated to display the allocation status in real time for each connection status.

The allocation status display control unit 422 may display the allocation status display screen 46 on a portion of or the entire screen of the display unit 41. When the allocation status display screen 46 is displayed on a portion of the screen of the display unit, it may be displayed in parallel to other screens or it may be displayed so as to overlap other screens.

Returning to FIG. 6, during a test, that is, while the communication unit 54 is communicating with the mobile communication terminal, the log data generation unit 56 generates a log of the communication sequence of the communication unit 54. Specifically, the log data generation unit 56 acquires communication data between the layers (Step 106), adds a log header to each communication data item, and stores the communication data as log data in the log data storage unit 57 (Step 107). Steps 106 and 107 are the precondition of "display process 2" of generating a display screen indicating the channel allocation status and the communication direction allocation status from log data, which will be described below. In Step 107, the log data may be stored and log display may be performed.

As described above, the allocation status display control unit 422 generates the allocation status display screen 46 indicating the correspondence between information indicating the physical channels and information indicating the time slots and the channelization codes for each connection status, on the basis of the specified allocation information acquired by the setting information acquisition unit 51. Therefore, the operator can easily check the allocation status for each connection status. As a result, it is possible to reduce the effort and time required for the operator to check the allocation status and thus save the operator trouble. Therefore, it is possible to facilitate, for example, debugging and improve the development efficiency of an apparatus used for mobile communication.

As shown in FIGS. 8 to 10, since the image indicating the allocation status is displayed in a table form, it is possible to improve the operator's intuitiveness in the recognition of the allocation status.

Since information indicating the time slot and information indicating the communication direction are displayed so as to be associated with each other, the operator can intuitively check the association between the allocation status of the physical channel and the communication direction of the time slot.

In this embodiment, the connection status determining unit 511 determines the current connection status, and the allocation status is displayed in real time for each connection status during a test. Therefore, the operator can check the current connection status in real time. In addition, the operator can check the association between the connection status and the current allocation status in real time.

Since the display format 45 (see FIG. 5) of the allocation status according to this embodiment includes the space region 456 corresponding to the slots DwPTS, GP, and UpPTS (see FIG. 2), the operator can intuitively connect the TD-SCDMA frame structure and the allocation status display screen 46. Therefore, it is easy to check the allocation status.

In the region indicating the communication direction, an uplink is represented by "U" and a downlink is represented "D". However, the letters indicating the communication directions are not limited thereto. For example, the communication directions may be represented by figures or symbols, for example, an up arrow or a down arrow or blocks with different colors or shapes may be applied to the communication directions.

(Display Process 2 of Allocation Status by Test Device)

Figure 11:
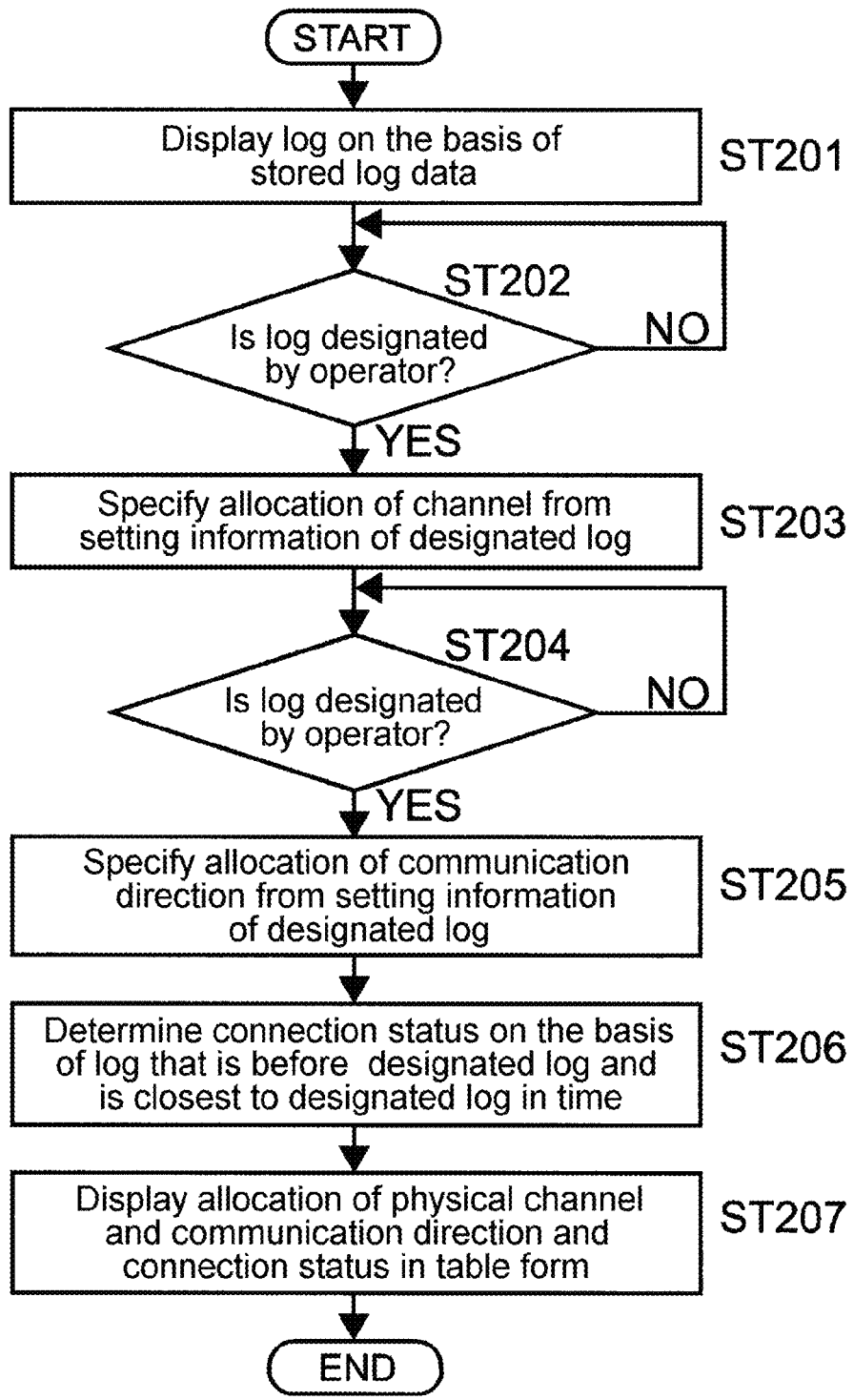
FIG. 11 is a flowchart illustrating an allocation status display process when a log is analyzed after log data is generated and stored, particularly, after a test is performed.

Next, an allocation status display process during log analysis after the log data is generated and stored, particularly, after the test is performed will be described. FIG. 11 is a flowchart illustrating the process.

Figure 12:
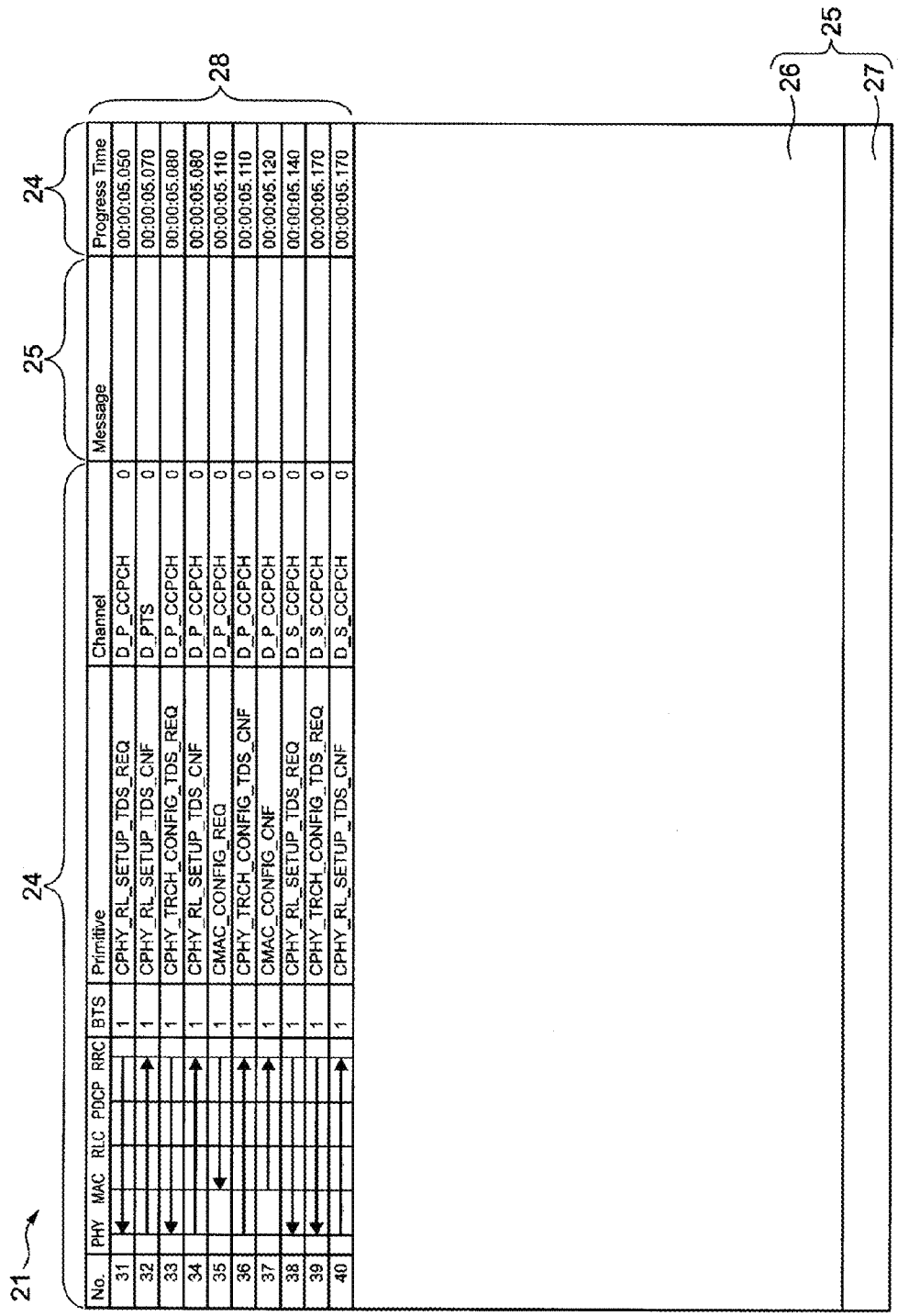
FIG. 12 shows an example of a screen indicating a log list.

The log display control unit 421 displays a log on the display unit 41 on the basis of the log data stored in the log data storage unit 57 (Step 201). The log can be displayed in any format. For example, as shown in FIG. 12, a list of logs is displayed.

A log display screen 21 includes a log header information display area 24 in which information in the log header included in the log data is displayed in time series from the upper side to the lower side and a communication data information display area 25 in which the content of communication data is displayed. FIG. 12 shows only a fraction of the large amount of generated log data, as described above. For example, the upper region (denoted by reference numeral 28) of the screen is scrolled to display other log data which are not currently displayed.

The log header information display area 24 includes a region in which "No.", "PHY" to "RRC", "Primitive", "Channel", and "Progress Time" corresponding to some of the data included in the log header are displayed. These items are information included in the log header.

"No." is the sequential identification number of each log data item. In this embodiment, "No." is the number generated by the ID generation unit 562.

In "PHY" to "RRC", the communication direction of data between the layers is represented by an arrow. These items are displayed on the basis of information about the transmission source layer and the destination layer. In the example shown in FIG. 12, log data with Nos. 31, 33, 35, 38 and 39 are downlink data and log data with Nos. 32, 34, 36, 37, and 40 are uplink data. For example, log data with Nos. 35 and 37 indicate the request and confirmation of signals between the RRC layer and the MAC layer.

"Primitive" indicates a setting command between the layers. In the example shown in FIG. 12, "Primitive" indicates settings when the radio link is set up.

"BTS" is a BTS number and indicates the number of the (pseudo-) base station. The test device 50 has a plurality of functions of the base station for a hand-over test.

"Channel" is displayed on the basis of the channel information and indicates a communication channel used for communication. In the example shown in FIG. 12, P-CCPCH is used.

"Progress Time" is the time added by the time generation unit 561.

The communication data information display area 25 includes an item "Message". The item "Message" indicates a message name or a message type (hereinafter, simply referred to as a message name). The message name is extracted from, for example, the test scenario or it is created on the basis of the test scenario by the message processing unit 543. In the example shown in FIG. 12, no data is described in the item "Message". However, for example, all of the log data shown in FIG. 12 have the same message and the message name is displayed for one representative log.

The communication data information display area 25 includes two areas 26 and 27 which are provided below the log display screen 21. In the two areas, the communication data of the log (which will be described below) designated by an operation of the operator through the operation unit 43 is displayed. In the example shown in FIG. 12, no data is displayed in the areas 26 and 27 because the operator has not yet designated any log.

Figure 13:
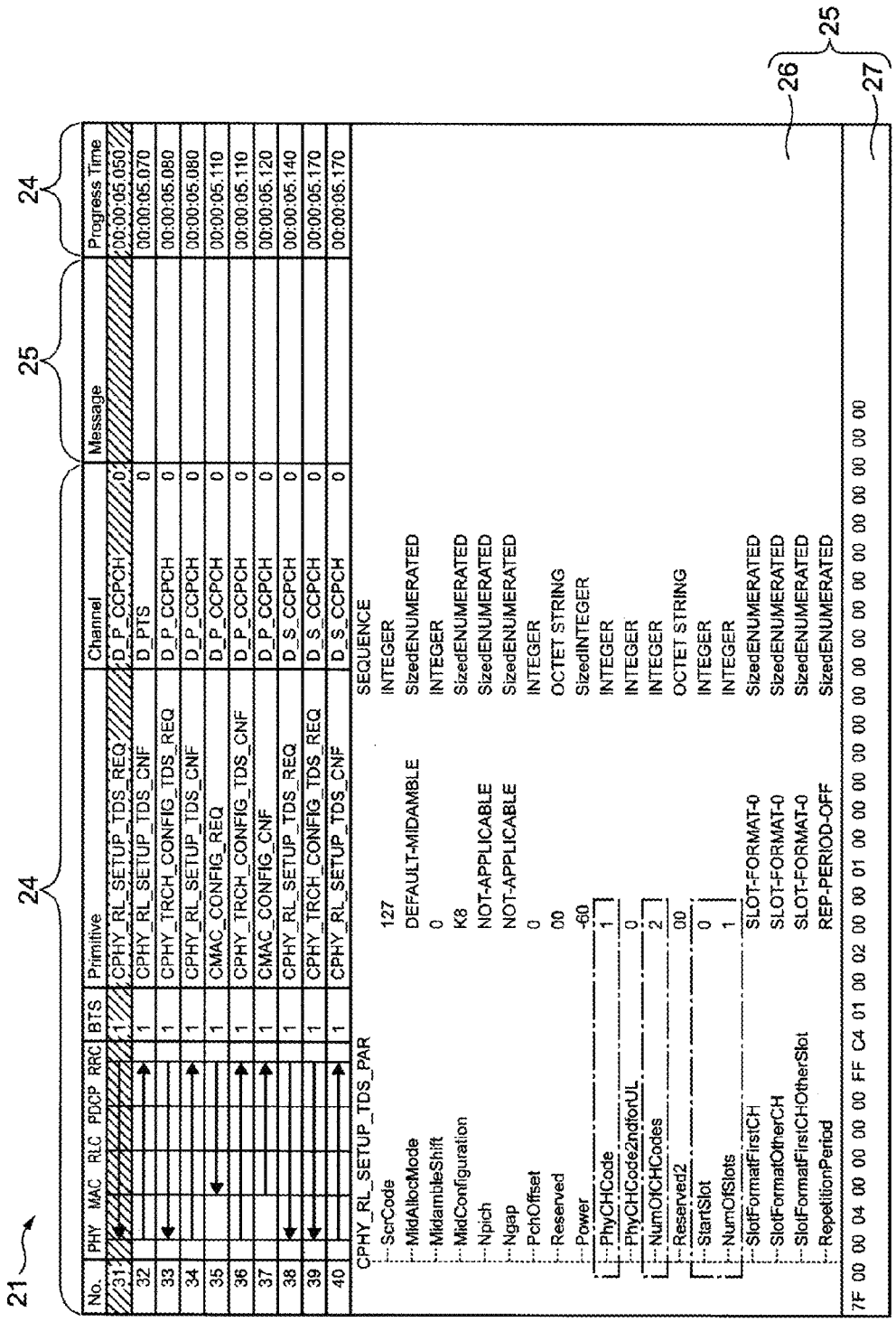
FIG. 13 shows an example of a screen when one log is designated in the log list.

Returning to the description of the flowchart shown in FIG. 11, the operator designates desired log data, for example, log data No. 31 shown in FIG. 12 while referring to the log display screen 21 (YES in Step 202). Then, as shown in FIG. 13, for example, the field of the log data No. 31 is highlighted. At that time, communication data in the log data designated by the operator is converted and displayed in the upper area 26 in the communication data information display area 25. For example, CPHY-RL-SETUP-TDS-PAR . . . is displayed in the upper area 26 and various parameters which are related to the setup of the displayed information and follow the displayed information are displayed. A hexadecimal number (for example, 7F 00 00 04 00 00 . . . ) is displayed in the lower area 27.

In the example shown in FIG. 13, setting information related to the allocation of the physical channel is included in the communication data in the designated log No. 31, as shown in a portion surrounded by a one-dot chain line. Among various logs, a log including the setting information related to the allocation of the physical channel is predetermined by the "Message" (message name) thereof. Alternatively, the log may not be predetermined by the message name, but may be predetermined by "Primitive" (primitive name). The operator who has knowledge of this technique knows the message name or the primitive name corresponding to the log including the setting information and can designate the log including the setting information.

For example, information about a common channel, such as S-CCPCH or PICH, is included in the message related notification information such as SIB5 (System Information Block Type5).

For example, information related to a dedicated channel, such as DPCH or HS-PDSCH, is included in the following messages and is distinguished by the status.

Message names: RRC Connection Setup/Radio Bearer Setup/Radio Bearer Release/Radio Bearer Reconfiguration/Transport Channel Reconfiguration/Physical Channel Reconfiguration/Cell Update Confirmation The setting information acquisition unit 51 acquires the setting information included in the designated log and specifies channel allocation from the setting information (parameters surrounded by a one-dot chain line in FIG. 13) (Step 203).

The operator who has knowledge of this technique designates a log which includes the setting information related to the allocation of the communication direction and is close to the log designated in Step 202 among various logs (YES in Step 204). Here, log data for the log and communication data included in the log are not shown. The setting information acquisition unit 51 acquires the setting information included in the designated log and specifies the allocation of the communication direction to each time slot from the setting information (for example, information about the switching point) (Step 205).

The connection status determining unit 511 determines the connection status on the basis of the log that is before the time of the designated log and is closest to the time of the designated log (Step 206). Since the type of connection status is associated with the message name or the parameter in the communication data of the log, the connection status determining unit 511 can determine the connection status. When the connection status is determined, the allocation status display control unit 422 displays the allocation of the physical channel, the allocation of the communication direction, and the determined connection status on the display unit 41 in a table form, as shown in FIGS. 8 to 10 (Step 207).

A series of processes in Steps 201 to 207 is repeated to display the allocation status for each connection status.

As described above, in this embodiment, it is possible to display the allocation status display screen 46 on the basis of the setting information included in the log data which is designated by the operator. Therefore, for example, after a test, the operator can arbitrarily designate the desired log data and easily check the content of the allocation status display screen 46 which is displayed in the latest connection status. This is particularly effective in examining the cause of an error in a given connection status when the test result is analyzed.

Since an arbitrary log can be designated, the operator can designate the communication data of an arbitrary layer. Therefore, it is possible to examine the cause of an error while considering the association between the process of each layer and the allocation status display screen 46 on the basis of the association.

Second Embodiment

Figure 14:
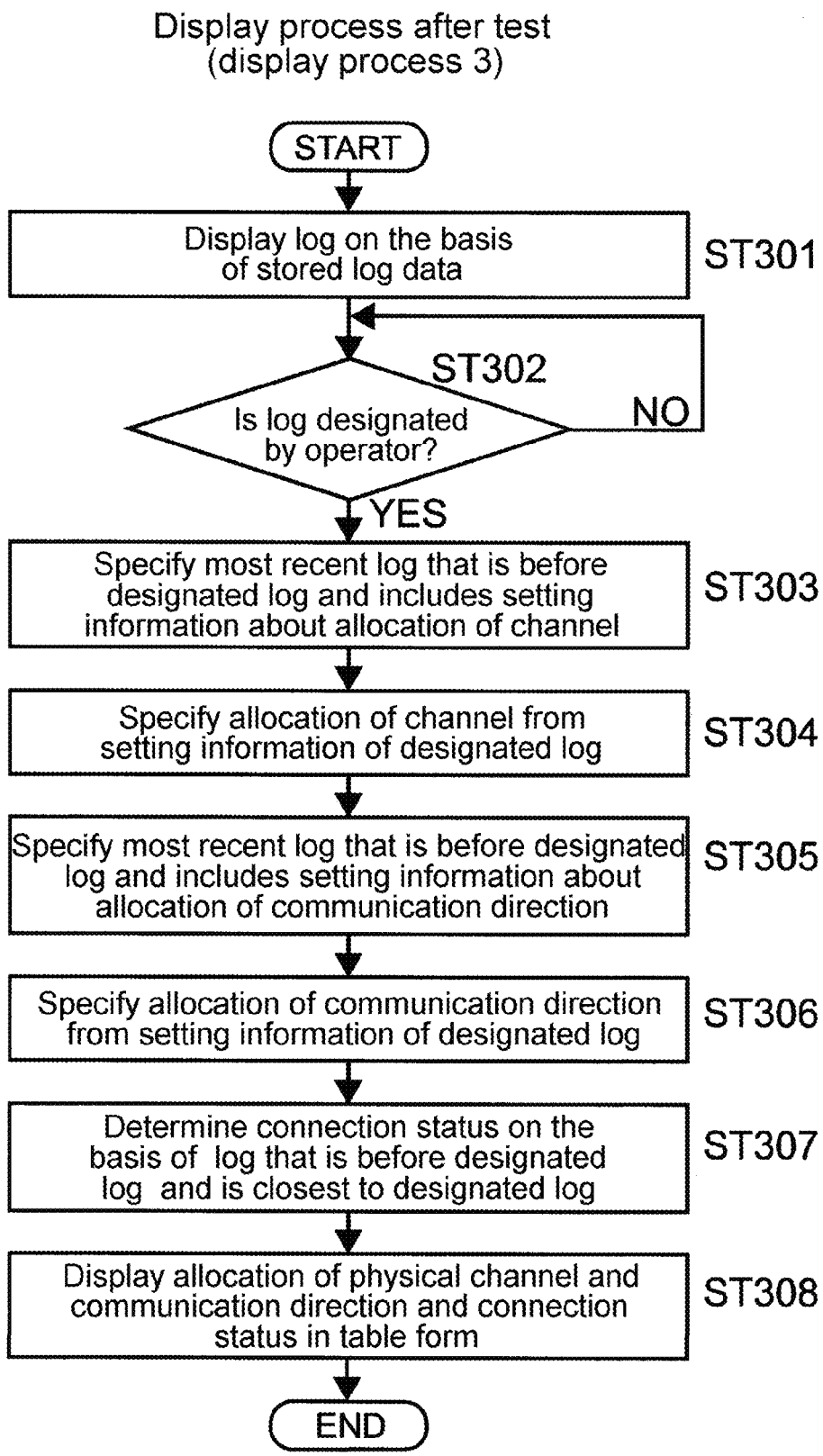
FIG. 14 is a flowchart illustrating a display process after a test according to a second embodiment of the invention.

FIG. 14 is a flowchart illustrating a display process (display process 3) after a test according to a second embodiment of the invention. Hereinafter, the same device and process as those in the first embodiment will be described briefly or the description thereof will not be repeated. The description is focused on the difference between the first embodiment and the second embodiment. A test device according to this embodiment has the same structure as the test device 50 shown in FIG. 1.

The display process shown in FIG. 14 is characterized by the specification of log data including setting information to be extracted on the basis of an arbitrary log designated by the operator even when the operator does not recognize a log including the setting information related to the allocation of a physical channel and a communication direction among various logs.

A log display control unit 421 displays a log using the same process as that in Step 201 (Step 301). The operator designates, for example, log No. 32 shown in FIG. 12 among various logs (YES in Step 302). Then, the setting information acquisition unit 51 specifies log No. 31, which is the nearest log including the setting information related to channel allocation, before the time of the designated log (Step 303). The setting information acquisition unit 51 can store the type of message name (or primitive name) of the log data including the setting information to be extracted in advance and specify log data which includes information about the same message name as the stored message name or a corresponding message name and the setting information to be extracted. That is, the setting information acquisition unit 51 can specify log data related to the designated log and acquire, from the log data, the setting information to be extracted.

When the operator designates any one of the logs displayed on the display unit 41, the nearest log which is not displayed on the display unit 41 and has a corresponding message name is likely to be specified.

The setting information acquisition unit 51 specifies channel allocation from the setting information of the specified log (Step 304).

Similarly, the setting information acquisition unit specifies the nearest log (a log related to the designated log) including the setting information (for example, information about the switching point) related to the allocation of the communication direction before the time of the designated log (Step 305).

The processes in Steps 306 to 308 are the same as those in Steps 205 to 207.

As described above, in the process according to this embodiment, even when the operator does not recognize the log including the setting information related to the allocation of both the physical channel and the communication direction, it is possible to specify the most recent log including the setting information and display the allocation status based on the specified log. In addition, even when the operator does not know the log including the setting information, the operator does not need to designate the log including the setting information intentionally and designates an arbitrary log that is close in time to the log including the setting information. Therefore, it is possible to automatically specify the log including the setting information and save the operator trouble.

Third Embodiment

Figure 15:
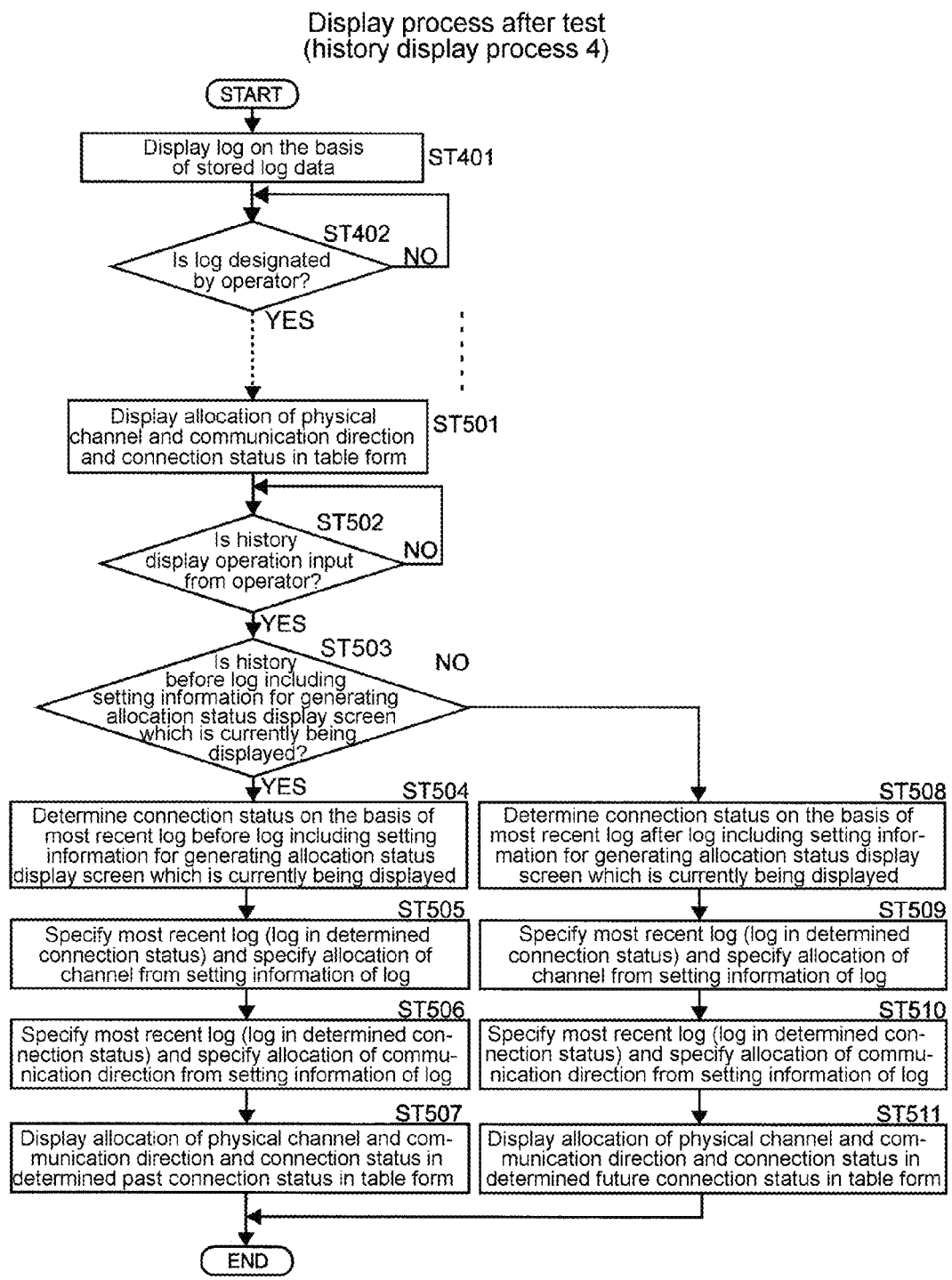
FIG. 15 is a flowchart illustrating a display process after a test according to a third embodiment of the invention.

FIG. 15 is a flowchart illustrating a display process (display process 4) after a test according to a third embodiment of the invention. This embodiment is characterized in that, for example, a process is performed which displays an allocation status display screen that is before or after the time of the connection status in the allocation status display screen 46 which is displayed in Steps 207 and 308 shown in FIGS. 11 and 14. The structure of the functional block of the test device according to this embodiment may be the same as that of the test device 50 shown in FIG. 1.

The processes in Steps 401, 402, . . . , 501 are the same as those in Steps 201 to 207 shown in FIG. 11 and Steps 301 to 308 shown in FIG. 14.

Figure 16:
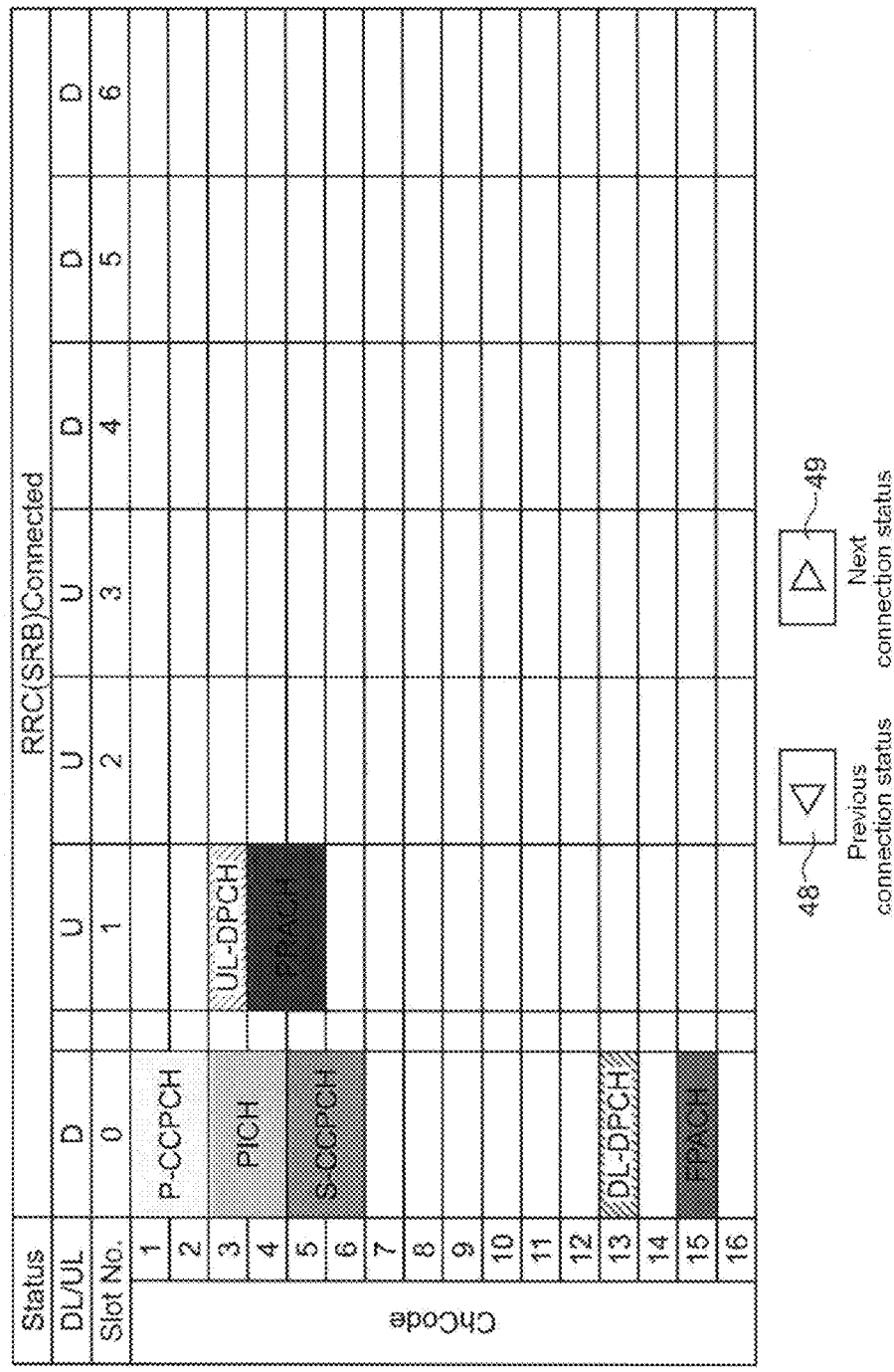
FIG. 16 shows an allocation status display screen 46 in a connection status (the same allocation status as that shown in FIG. 9) in which RRC (SRB) is connected which is displayed in Step 501 of FIG. 15.

FIG. 16 shows an allocation status display screen 46 in a connection status (the same allocation status as that shown in FIG. 9) in which RRC (SRB) displayed in, for example, Step 501 is connected. Buttons 48 and 49 for displaying, on a display unit 41, allocation status display screens 46 in the past and future connection statuses that are before and after the time of log data including setting information for generating the allocation status display screen 46 which is currently being displayed (displayed in Step 501) is provided below the allocation status display screen 46.

A setting information acquisition unit 51 monitors the input of an operation for displaying the history of the logs from the operator (Step 502). Specifically, the setting information acquisition unit 51 determines whether the operator uses the operation unit 43 to press any one of the button 48 for displaying the past (previous) connection status of the log and the button 49 for displaying the future (next) connection status of the log.

When the button 48 for displaying the screen of the connection status before the log including the setting information for generating the allocation status display screen 46 which is currently being displayed is pressed (YES in Step 503), a connection status determining unit 511 performs the following process. That is, the connection status determining unit 511 determines the connection status on the basis of the most recent log data that is before the time of the log including the setting information for generating the allocation status display screen 46 which is currently being displayed (Step 504). The setting information acquisition unit 51 specifies the most recent log (a log in the determined connection status), acquires setting information related to the physical channel from the log, and specifies the allocation of a channel from the setting information (Step 505). Similarly, the setting information acquisition unit 51 specifies the most recent log (a log in the determined connection status), acquires setting information related to the communication direction from the log, and specifies the allocation of the communication direction from the setting information (Step 506). Then, an allocation status display control unit 422 displays screens indicating the specified allocation of the channel and the specified allocation of the communication direction as the allocation status display screens (Step 507). In this case, an allocation status display screen in the previous connection status of the screen shown in FIG. 9 is displayed.

When the determination result in Step 503 is "NO", that is, when the button 49 for displaying the screen in the connection status after the time of the log including the setting information for generating the allocation status display screen 46 which is currently being displayed is pressed, the following process is performed. That is, in Steps 508 to 511, the setting information acquisition unit 51 specifies the connection status, the allocation of a channel, and the allocation of a communication direction from the most recent log group after the time of the log including the setting information for generating the allocation status display screen 46 which is currently being displayed. The allocation status display control unit 422 displays a screen indicating the state thereof as the allocation status display screen. In this case, an allocation status display screen in the next connection status of the screen shown in FIG. 9 is displayed.

The test device 50 can repeatedly perform the process from Step 502 on the basis of the allocation status display screen 46 which is currently being displayed. In this case, the operator can check the history of the allocation status display screen from the connection status of the allocation status display screen which is currently being displayed, while tracing the past or future connection status.

As described above, the allocation status display screen in the past or future connection status is displayed on the basis of the setting information of the log in the past or future connection status of the allocation status display screen 46 which is currently being displayed. Therefore, the operator can easily check the allocation status display screen close to the time of the designated log. As a result, it is easy to specify the cause of an error which occurs near the time of the log.

When the allocation status display screen 46 is displayed in Step 501, the display control unit may store the allocation status display screen in one or more connection statuses before and after the displayed connection status in a display buffer memory (not shown). In this case, when the button 48 or 49 is pressed, it is possible to increase the display speed of the history of the allocation status display screen. Therefore, it is possible to reduce the time required to specify the cause of an error which occurs near the time of the log designated by the operator.

An operation interface for indicating the past and future connection statuses is not limited to the buttons formed by a GUI, but may be a mechanical operation unit which is provided in or connected to the body of the test device 50. In addition, the operation interface is not limited to the button, but an allocation status display screen in a connection status before or after the connection status of the allocation status display screen which is currently being displayed can be displayed by, for example, a scroll function provided in the allocation status display screen 46.

In FIG. 15, the process in Step 504 may be performed after Step 506. Similarly, the process in Step 508 may be performed after Step 510.

Fourth Embodiment

Figure 17:
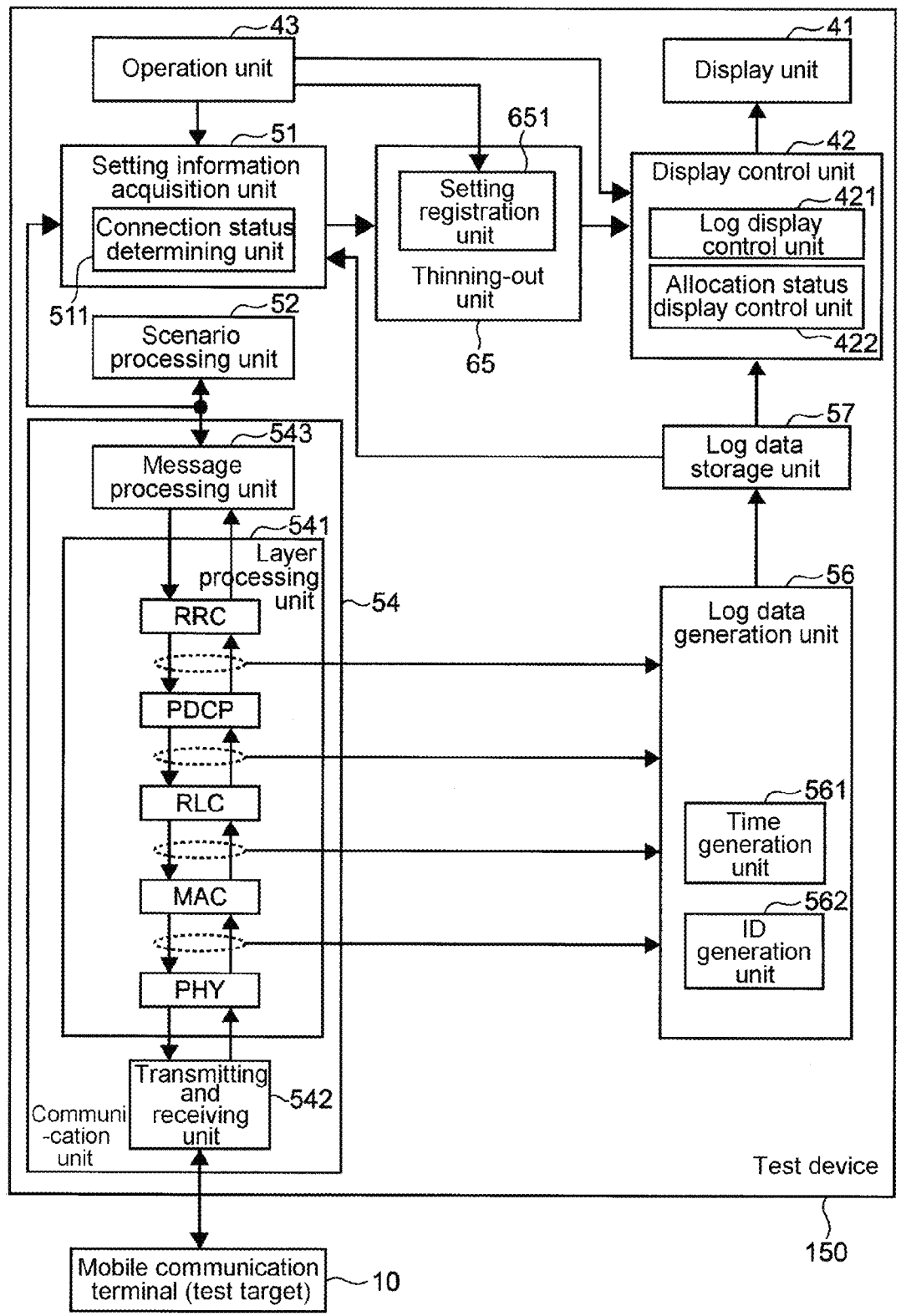
FIG. 17 is a block diagram illustrating the structure of a system including a test device according to a fourth embodiment of the invention.

FIG. 17 is a block diagram illustrating the structure of a system including a test device according to a fourth embodiment of the invention.

A test device 150 according to this embodiment includes a thinning-out unit 65 that thins out the amount of image data of an allocation status display screen 46 to be generated by an allocation status display control unit 422 in the real-time display process. The thinning-out unit 65 includes a setting registration unit 651 that registers the settings of a thinning-out process. The operator operates an operation unit 43 to input the settings of the operation thinning-out process and the setting registration unit 651 stores the settings.

The allocation status display control unit 422 generates an allocation status display screen 46 on the basis of data which is extracted by a process based on the settings registered by the thinning-out unit 65 and displays the allocation status display screen 46 on a display unit 41.

An example of some of the settings of the thinning-out process of the thinning-out unit 65 from the allocation status display screen 46 shown in FIGS. 8 to 10 as a basic allocation screen will be described below.

(a) Display of the allocation of one or more arbitrary physical channels which are selected by the operator in advance among various physical channel to time slot #0 to time slot #6

(b) Display of the allocation of one or more arbitrary time slots and one or more channelization codes which are selected by the operator in advance among time slot #0 to time slot #6 and channelization code numbers 1 to 16 to a physical channel (c) Display of the allocation of data in one direction which is selected by the operator in advance of a downlink and an uplink to a time slot (d) Display of an allocation status in one or more arbitrary connection statuses which are selected by the operator in advance among various connection statuses (e) Display of allocation by a combination of at least two of (a) to (d)

When the operator sets any one of the thinning-out processes (a) to (e), the setting registration unit 651 registers the settings.

Figure 18:
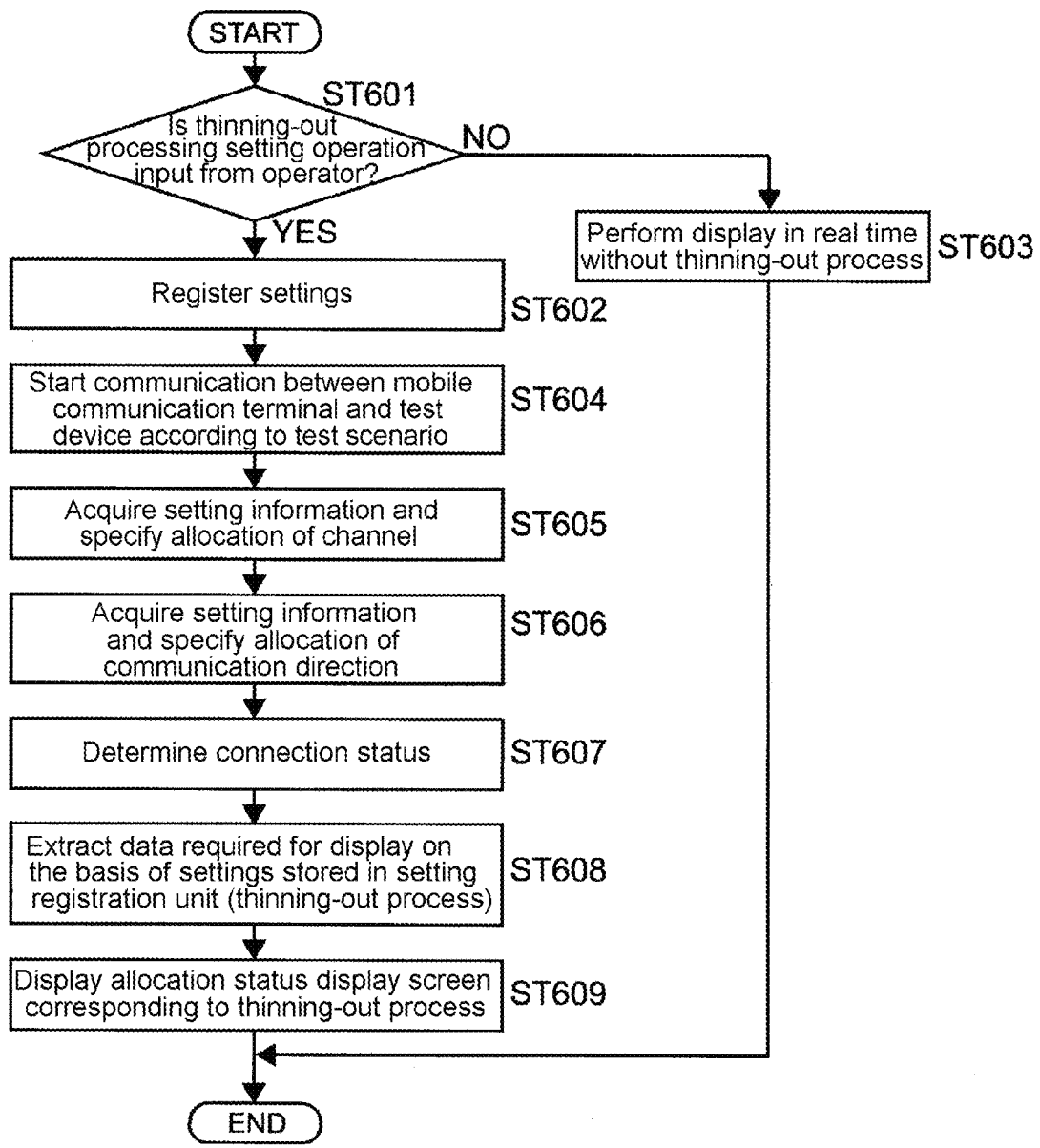
FIG. 18 is a flowchart illustrating a process of displaying an allocation status display screen in real time which includes a thinning-out process.

FIG. 18 is a flowchart illustrating a process (display process 5) of displaying the allocation status display screen 46 including the thinning-out process in real time.

When the operator sets the thinning-out process (YES in Step 601), the setting registration unit 651 registers the settings (Step 602). When there is no setting operation (NO in Step 601), the test device 150 performs a display process (for example, display process 1 shown in FIG. 6) in real time, without performing the thinning-out process (Step 603).

The process in Steps 604 to 607 is the same as that in Steps 101 to 104 shown in FIG. 6.

Figure 19:
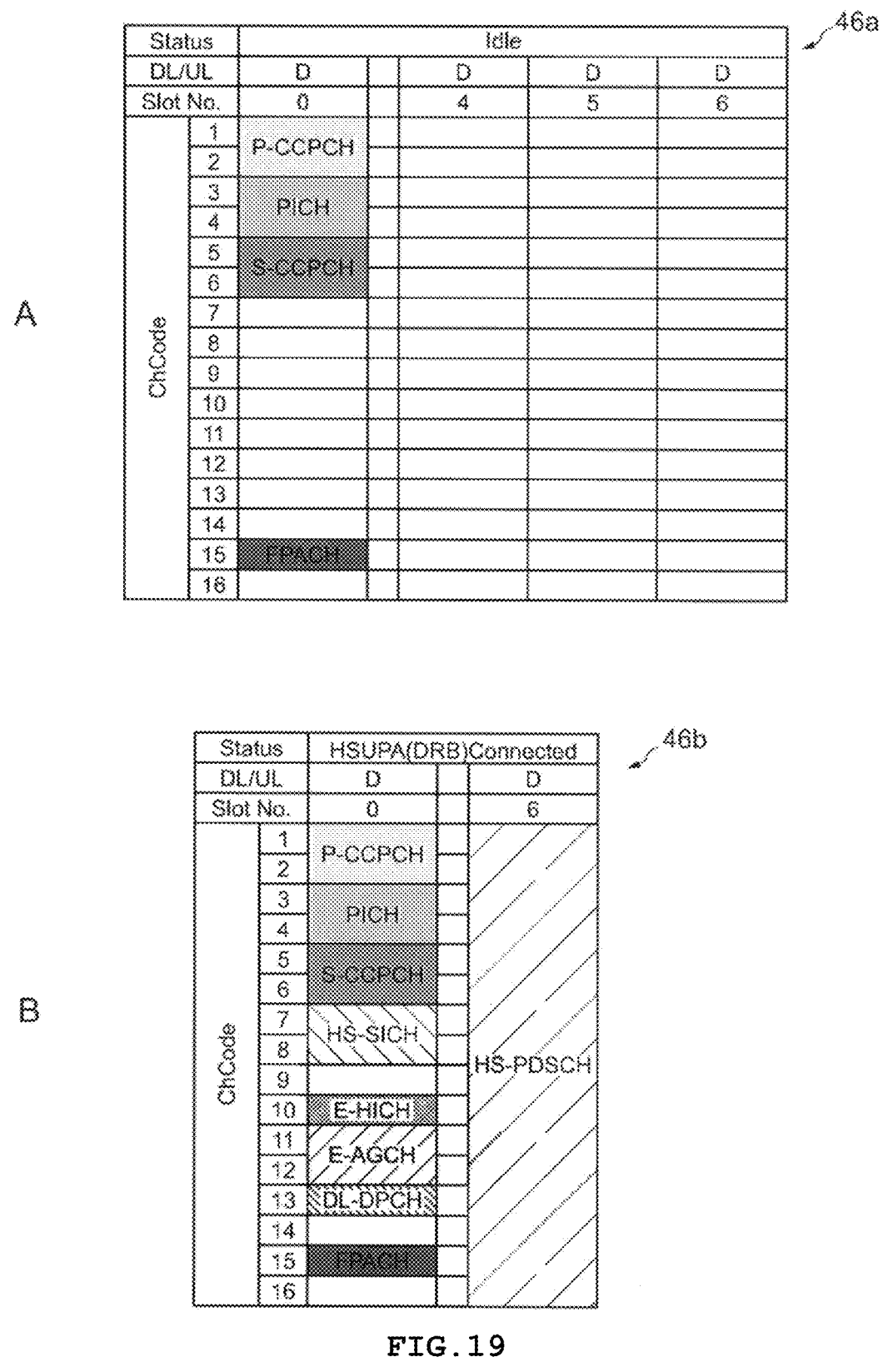

After Step 607, the thinning-out unit 65 extracts data required for display from the setting information (including information about a connection status) acquired by a setting information acquisition unit 51 on the basis of the settings (Step 608). That is, the thinning-out unit 65 performs the thinning-out process of removing data which is unnecessary for display. Then, the allocation status display control unit 422 displays allocation status display screens 46a and 46b (see FIG. 19) in which the amount of data is reduced by the thinning-out process on the display unit 41 (Step 609).

FIGS. 19A and 19B show examples of the allocation status display screens which are sequentially generated by a combination of the thinning-out processes (c) and (d) among various settings of the thinning-out process. In the settings, only a downlink is displayed for the thinning-out process (c). In addition, for the thinning-out process (d), the display of the state in which the position is registered and the state in which HSUPA (DRB) is connected, that is, the display of the state in which RRC (SRB) shown in FIG. 9 is connected among, for example, three types of connection statuses shown in FIGS. 8 to 10 is omitted.

The above-mentioned thinning-out process makes it possible to reduce the load of the process of the display control unit 42 generating the allocation status display screen which is changed in real time, that is, the load of the display process and the screen monitoring load of the operator.

Specifically, in the real-time display process, since the allocation status display screen 46 is changed over time, the allocation status is not displayed in all types of connection statuses, but the allocation status display screens 46a and 46b are displayed in the connection status selected by the operator, as in (d) among the examples of the settings. Therefore, the load of the display process is significantly reduced and the screen monitoring load of the operator as the tester is reduced. In particular, items which are unnecessary for the operator are not displayed and only the items that the operator wants to check can be displayed as the allocation status display screens 46a and 46b. Therefore, the operator can easily check the allocation status, which makes it possible to reduce an error in the check of a target item.

The thinning-out process according to this embodiment is not limited to when the real-time display process is performed, but can be applied to a process of designating a log after a test and displaying the allocation status, as described in display processes 2 to 4. In this case, particularly, as described above, only the item that the operator wants to check is displayed as the allocation status display screen and it is possible to reduce the number of unnecessary items. Therefore, it is possible to easily check the allocation status and reduce an error in the check of a target item.

Other Embodiments

The invention is not limited to the above-described embodiments, but various other embodiments can be made.

In the above-described embodiments, the TD-SCDMA communication system is used. However, the invention is not limited to the TD-SCDMA communication system, but TDD and CDMA communication systems may be used.

For example, the allocation status display screen 46 shown in FIG. 8 includes the allocation of the communication direction to the time slot and the display of the connection status. However, at least one of the two items is not necessarily displayed. In addition, the vertical axis may indicate information indicating the time slot and the horizontal axis may indicate information indicating the channelization code.

At least two of the characteristic portions of the above-described embodiments may be combined with each other.

DESCRIPTION OF REFERENCE NUMERALS AND SIGNS

10: MOBILE COMMUNICATION TERMINAL
41: DISPLAY UNIT
42: DISPLAY CONTROL UNIT
43: OPERATION UNIT
45: DISPLAY FORMAT
46: ALLOCATION STATUS DISPLAY SCREEN
50, 150: TEST DEVICE
51: SETTING INFORMATION ACQUISITION UNIT
52: SCENARIO PROCESSING UNIT
54: COMMUNICATION UNIT
56: LOG DATA GENERATION UNIT
57: LOG DATA STORAGE UNIT
65: THINNING-OUT UNIT
421: LOG DISPLAY CONTROL UNIT
422: ALLOCATION STATUS DISPLAY CONTROL UNIT
451: TIME SLOT NUMBER REGION
452: COMMUNICATION DIRECTION ALLOCATION REGION
453: CHANNELIZATION CODE REGION
454: CHANNEL ALLOCATION REGION
455: REGION INDICATING CONNECTION STATUS
456: SPACE REGION
511: CONNECTION STATUS DETERMINING UNIT

What is claimed is:

1. A test device for testing a mobile communication terminal that can communicate using a code division multiple access system and a time division duplex system in which a communication frame is divided into a plurality of time slots, comprising:
a communication unit that sets various physical channels and communicates with the mobile communication terminal;
a display unit;
a display control unit that generates a display screen related to the test and displays the display screen on the display unit; and
a setting information acquisition unit that acquires setting information related to allocation of the physical channels,
wherein the display control unit includes an allocation status display control unit that generates an allocation status display screen indicating the correspondence of the physical channels to the time slot and a channelization code on the basis of the acquired setting information.

2. The test device according to claim 1,
wherein the allocation status display control unit generates the allocation status display screen in a table form in which a horizontal axis is a region indicating the time slot and a vertical axis is a region indicating the channelization code.

3. The test device according to claim 1, further comprising:
a scenario processing unit that directs the communication unit to perform communication according to a test scenario in which a communication sequence with the mobile communication terminal is described,
wherein the setting information acquisition unit acquires setting information related to the allocation of the physical cal channels which is included in the test scenario.

4. The test device according to claim 3,
wherein the setting information acquisition unit acquires setting information related to a communication direction for each time slot which is included in the test scenario, and
the allocation status display control unit further generates information indicating the communication direction for each time slot in the allocation status display screen on the basis of the acquired setting information.

5. The test device according to claim 3,
wherein the setting information acquisition unit includes a connection status determining unit that determines a connection status between the mobile communication terminal and the communication unit on the basis of the test scenario, and
the allocation status display control unit further generates information indicating the determined connection status in the allocation status display screen.

6. The test device according to claim 1, further comprising:
a log data generation unit that generates log data of a communication sequence of the communication unit,
wherein the display control unit further includes a log display control unit that displays a list of the log data on the display unit, and
the setting information acquisition unit acquires setting information related to the allocation of the physical channels which is included in log data designated by an operator or log data related to the designated log data in the list of the log data.

7. The test device according to claim 6,
wherein the setting information acquisition unit acquires setting information related to the communication direction for each time slot which is included in the designated log data or the log data related to the designated log data, and the allocation status display control unit further generates information indicating the communication direction for each time slot in the allocation status display screen on the basis of the acquired setting information.

8. The test device according to claim 6,
wherein the setting information acquisition unit includes a connection status determining unit that determines a connection status between the mobile communication terminal and the communication unit on the basis of the designated log data or the log data related to the designated log data, and the allocation status display control unit further generates information indicating the determined connection status in the allocation status display screen.

9. The test device according to claim 8,
wherein the allocation status display control unit generates an allocation status display screen indicating the correspondence of the physical channels to the time slot that is before or after the time of the connection status in the allocation status display screen generated by the display control unit, in response to an operation of the operator.

10. The test device according to claim 1, further comprising:
a thinning-out unit that thins out the amount of data of the allocation status display screen to be generated by the allocation status display control unit.

11. A test method for testing a mobile communication terminal that can communicate using a code division multiple access system and a time division duplex system in which a communication frame is divided into a plurality of time slots, comprising:
a step of acquiring setting information related to allocation of physical channels which are set for communication with the mobile communication terminal;
a step of generating an allocation status display screen indicating the correspondence of the physical channels to the time slot and a channelization code on the basis of the acquired setting information; and
a step of displaying the allocation status display screen.

12. The test method according to claim 11,
wherein the step of generating the allocation status display screen generates the allocation status display screen in a table form in which a horizontal axis is a region indicating the time slot and a vertical axis is a region indicating the channelization code.

13. The test method according to claim 11,
wherein the step of acquiring the setting information acquires setting information related to the allocation of the physical channels which is included in a test scenario in which a communication sequence with the mobile communication terminal is described.

14. The test method according to claim 13,
wherein the step of acquiring the setting information acquires setting information related to a communication direction for each time slot which is included in the test scenario, and the step of generating the allocation status display screen further generates information indicating the communication direction for each time slot in the allocation status display screen on the basis of the acquired setting information.

15. The test method according to claim 13,
wherein a connection status with the mobile communication terminal is determined on the basis of the test scenario, and the step of generating the allocation status display screen further generates information indicating the determined connection status in the allocation status display screen.

16. The test method according to claim 11,
wherein log data of a communication sequence with the mobile communication terminal is generated,
a list of the log data is displayed, and
the step of acquiring the setting information acquires setting information related to the allocation of the physical channels which is included in log data designated by an operator or log data related to the designated log data in the list of the log data.

17. The test method according to claim 16,
wherein the step of acquiring the setting information acquires setting information related to the communication direction for each time slot which is included in the designated log data or the log data related to the designated log data, and the step of generating the allocation status display screen further generates information indicating the communication direction for each time slot in the allocation status display screen on the basis of the acquired setting information.

18. The test method according to claim 16,
wherein a connection status with the mobile communication terminal is determined on the basis of the designated log data or the log data related to the designated log data, and the step of generating the allocation status display screen further generates information indicating the determined connection status in the allocation status display screen.

19. The test method according to claim 18,
wherein an allocation status display screen indicating the correspondence of the physical channels to the time slot that is before or after the time of the connection status in the generated allocation status display screen is generated in response to an operation of the operator.

20. The test method according to claim 11,
wherein the amount of data of the allocation status display screen to be generated in the step of generating the allocation status display screen is thinned out.

* * * * *